(12) United States Patent
Schiffer et al.

(10) Patent No.: US 9,870,350 B2
(45) Date of Patent: Jan. 16, 2018

(54) PIE CHART BASED INFORMATION MANAGEMENT SYSTEM

(71) Applicant: ADP, LLC, Roseland, NJ (US)

(72) Inventors: Jordan Schiffer, Brooklyn, NY (US); Keith Wilson Fulton, South Orange, NJ (US); Gregory Peter Kavanagh, New York, NY (US)

(73) Assignee: ADP, LLC, Roseland, NJ (US)

( * ) Notice: Subject to any disclaimer, the term of this patent is extended or adjusted under 35 U.S.C. 154(b) by 204 days.

(21) Appl. No.: 14/615,784

(22) Filed: Feb. 6, 2015

(65) Prior Publication Data

US 2016/0027193 A1 Jan. 28, 2016

Related U.S. Application Data

(60) Provisional application No. 62/029,910, filed on Jul. 28, 2014.

(51) Int. Cl.
| | |
|---|---|
| *G06T 11/20* | (2006.01) |
| *G06T 11/60* | (2006.01) |
| *G06F 17/24* | (2006.01) |
| *G06Q 10/06* | (2012.01) |
| *H04L 29/08* | (2006.01) |
| *G06F 17/21* | (2006.01) |
| *G06K 9/00* | (2006.01) |
| *G06K 9/62* | (2006.01) |

(52) U.S. Cl.
CPC ............ *G06F 17/24* (2013.01); *G06F 17/212* (2013.01); *G06K 9/00288* (2013.01); *G06K 9/6201* (2013.01); *G06Q 10/06* (2013.01); *G06T 11/206* (2013.01); *G06T 11/60* (2013.01); *H04L 67/1053* (2013.01); *H04L 67/22* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 4,674,042 A | * | 6/1987 | Hernandez ............ G06T 11/206 345/440 |
| 5,513,271 A | | 4/1996 | Rao et al. |
| 5,550,970 A | * | 8/1996 | Cline ........................ G06F 9/50 345/440 |

(Continued)

*Primary Examiner* — Barry Drennan
*Assistant Examiner* — Jason Pringle-Parker
(74) *Attorney, Agent, or Firm* — Yee & Associates, P.C.

(57) ABSTRACT

A method for visually accessing information. A computer system displays pie charts in a graphical user interface in a display system. The pie charts have sections that represent pieces of the information, and each of the pie charts represents a type of the information. The computer system receives a user input selecting a portion of the sections from the pie charts displayed in the graphical user interface. The computer system displays a new pie chart in the graphical user interface using the portion of the sections selected by the user input. The new pie chart has new sections representing selected pieces of the information corresponding to the portion of the sections. The new sections have sizes based on a policy, and the sizes for the new sections indicates relative values of the pieces of the information with respect to each other. The new pie chart enables visually accessing the information.

18 Claims, 20 Drawing Sheets

(56) References Cited

U.S. PATENT DOCUMENTS

| | | | | |
|---|---|---|---|---|
| 5,675,753 | A * | 10/1997 | Hansen | G06F 8/34 707/999.102 |
| 7,454,412 | B2 | 11/2008 | Diewald et al. | |
| 8,484,149 | B1 | 7/2013 | Kelly | |
| 2005/0068320 | A1* | 3/2005 | Jaeger | G06T 11/206 345/440 |
| 2005/0285861 | A1* | 12/2005 | Fraser | G06T 3/0025 345/428 |
| 2006/0010055 | A1* | 1/2006 | Morita | G06Q 40/00 705/35 |
| 2008/0109740 | A1* | 5/2008 | Prinsen | G06F 3/0486 715/764 |
| 2008/0192056 | A1* | 8/2008 | Robertson | G06T 13/80 345/440 |
| 2011/0283231 | A1* | 11/2011 | Richstein | G06F 3/0488 715/810 |
| 2012/0148088 | A1 | 6/2012 | Mital et al. | |
| 2012/0324388 | A1 | 12/2012 | Rao et al. | |
| 2013/0106830 | A1 | 5/2013 | de Loera et al. | |
| 2013/0117711 | A1* | 5/2013 | Hayes | G06F 9/4443 715/800 |
| 2014/0040820 | A1* | 2/2014 | Ikeda | G06F 3/04883 715/800 |
| 2014/0053091 | A1* | 2/2014 | Hou | G06F 17/30389 715/769 |
| 2014/0324317 | A1* | 10/2014 | Schilling | B60K 37/02 701/99 |
| 2015/0254369 | A1* | 9/2015 | Hou | G06F 3/0486 707/798 |

* cited by examiner

PIE CHART BASED INFORMATION MANAGEMENT SYSTEM

RELATED PROVISIONAL APPLICATION

This application claims the benefit of U.S. Provisional Patent Application Ser. No. 62/029,910, filed Jul. 28, 2014, and entitled "Dynamic User Interface."

BACKGROUND INFORMATION

1. Field

The present disclosure relates generally to an improved computer system, and in particular, to a method and apparatus for accessing information in a computer system. Still more particularly, the present disclosure relates to a method and apparatus for managing information in a computer system using pie charts.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization. As another example, a research department in the organization may use an information system to store and analyze information to research new products, analyze products, or for other suitable operations.

Currently used information systems include databases. These databases store information about the organization. For example, these databases store information about employees, products, research, product analysis, business plans, and other information about the organization.

Information about the employees may be searched and viewed to perform various operations within an organization. However, this type of information in currently used databases may be cumbersome and difficult to visualize and manipulate. For example, combining information about employees may be desirable for performing operations such as identifying new hires, selecting teams for projects, and other operations in the organization. As a result, errors may occur in the analysis of the information and more time than desired may be needed to obtain desired information or combine information about the employees from a database in an information system.

Spreadsheets may be created to help in the analysis of information about employees. Information from a database may be exported to a spreadsheet, and a user may enter or modify the information in the spreadsheet. Spreadsheets may also be merged to combine information. Using spreadsheets to analyze or combine information may still be more difficult and cumbersome than desired.

Therefore, it would be desirable to have a method and apparatus that take into account at least some of the issues discussed above, as well as other possible issues. For example, it would be desirable to have a method and apparatus that overcome issues with analyzing or combining information for an organization in a database.

SUMMARY

An embodiment of the present disclosure provides a method for visually accessing information. The method displays, by a computer system, pie charts in a graphical user interface in a display system. The pie charts have sections that represent pieces of the information, and each of the pie charts represents a type of the information. The method receives, by the computer system, a user input selecting a portion of the sections from the pie charts displayed in the graphical user interface. The method also displays, by the computer system, a new pie chart in the graphical user interface using the portion of the sections selected by the user input. The new pie chart has new sections representing selected pieces of the information corresponding to the portion of the sections. The new sections have a number of sizes based on a policy, and the number of sizes for the new sections indicates relative values of the pieces of the information with respect to each other in the new pie chart. The new pie chart enables visually accessing the information.

Another embodiment of the present disclosure provides a computer system. The computer system comprises a display system and a pie chart system in communication with the display system. The pie chart system displays pie charts in a graphical user interface in the display system. The pie charts have sections that represent pieces of information, and each of the pie charts represents a type of the information; receives a user input selecting a portion of the sections from the pie charts displayed in the graphical user interface; and displays a new pie chart in the graphical user interface using the portion of the sections selected by the user input. The new pie chart has new sections representing selected pieces of the information corresponding to the portion of the sections. The new sections have a number of sizes based on a policy, and the number of sizes for the new sections indicates relative values of the pieces of the information with respect to each other in the new pie chart. The new pie chart enables visually accessing the information.

Yet another embodiment of the present disclosure provides a computer program product for visually accessing information. The computer program product comprises a computer readable storage media, first program code, second program code, and third program code. The first program code is stored on the computer readable storage media and displays pie charts in a graphical user interface in a display system. The pie charts have sections that represent pieces of information and each of the pie charts represents a type of the information. The second program code is stored on the computer readable storage media and receives a user input selecting a portion of sections from the pie charts displayed in the graphical user interface. The third program code is stored on the computer readable storage media and displays a new pie chart in the graphical user interface using the portion of the sections selected by the user input. The new pie chart has new sections representing selected pieces of the information corresponding to the portion of the sections. The new sections have a number of sizes based on a policy, and the number of sizes for the new sections indicates relative values of the pieces of the information with respect to each other in the new pie chart. The new pie chart enables visually accessing the information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that viewing, analyzing, combining or otherwise manipulating information may be more difficult than desired using database systems. The illustrative embodiments also recognize that spreadsheets also may not provide a desired level of ease in viewing, analyzing, combining or otherwise manipulating information. For example, when combining information by merging spreadsheets, importing text, or performing other operations with spreadsheets, visualizing, combining, or identifying what sources should be used may be more difficult than desired with spreadsheets.

Thus, the illustrative embodiments provide a method and apparatus for visually accessing information. In one illustrative embodiment, a computer system displays pie charts in a graphical user interface in a display system. The pie charts have sections that represent pieces of the information and each of the pie charts represents a type of the information. The computer system receives a user input selecting a portion of sections from the pie charts displayed in the graphical user interface. The computer system displays a new pie chart in the graphical user interface using the portion of sections selected by the user input. The new pie chart has new sections representing selected pieces of information corresponding to the portion of the sections in the pie charts. The new sections have a number of sizes based on a policy, and the number of sizes for the new sections indicates relative values of the pieces of information with respect to each other in the new pie chart. In this manner, the new pie chart enables visually accessing the information.

Figure 1:
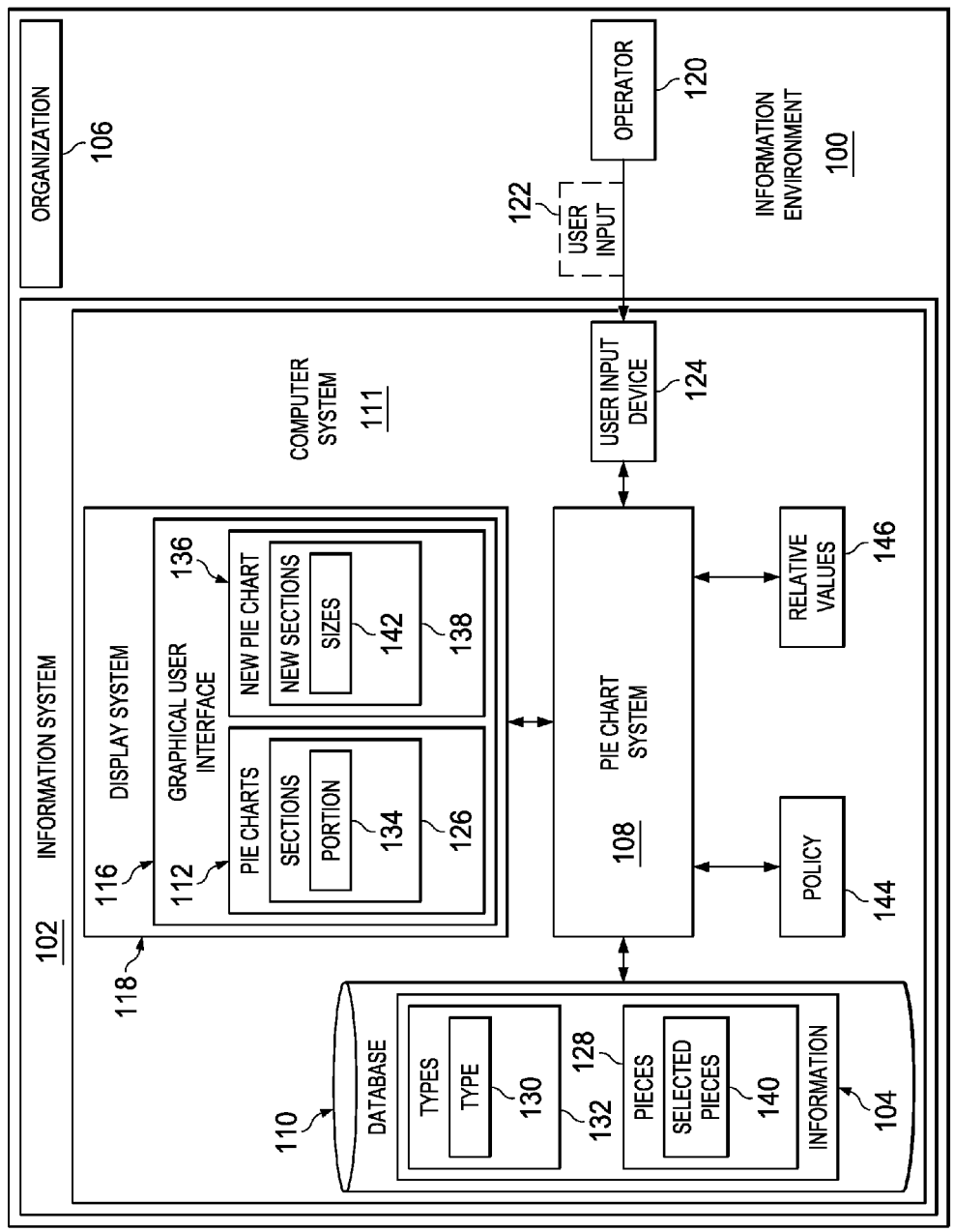
FIG. 1 is an illustration of block diagram of an information environment in accordance with an illustrative embodiment.

With reference now to the figures, and in particular, with reference to FIG. 1, an illustration of a block diagram of an information environment is depicted in accordance with an illustrative embodiment. In this illustrative example, information environment 100 includes information system 102. Information system 102 manages information 104 about organization 106.

Organization 106 may be, for example, a corporation, a partnership, a charitable organization, a city, a government agency, or some other suitable type of organization. Information 104 about organization 106 may include, for example, at least one of information about people, products, research, product analysis, business plans, financials, or other type information relating to organization 106.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Information system 102 may be selected from one of an employee information system, a research information system, a sales information system, an accounting system, a payroll system, or some other type of information system that stores and provides access to information 104 about organization 106.

In this illustrative example, information system 102 includes different components. As depicted, information system 102 includes pie chart system 108 and database 110. Pie chart system 108 and database 110 may be implemented in computer system 111.

As depicted, pie chart system 108 provides access to information 104 using pie charts 112 displayed in graphical user interface 116 in display system 118 in computer system 111. Pie chart system 108 may be implemented in software, hardware, firmware, or a combination thereof. When software is used, the operations performed by pie chart system 108 may be implemented in program code configured to run on hardware, such as a processor unit. When firmware is used, the operations performed by pie chart system 108 may be implemented in program code and data and stored in persistent memory to run on a processor unit. When hardware is employed, the hardware may include circuits that operate to perform the operations in pie chart system 108.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 111 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

As depicted, display system 118 is a hardware system and includes one or more display devices on which graphical user interface 116 may be displayed. Operator 120 may interact with graphical user interface 116 through user input 122 generated by user input device 124 in computer system 111. User input device 124 may be, for example, a mouse, a keyboard, a trackball, a touchscreen, a stylus, or some other suitable type of input device. For example, a pointer may be displayed in graphical user interface 116 that corresponds to user input device 124. In this example, user input device 124 moves the pointer to perform at least one of selecting operations or drag and drop operations in graphical user interface 116. Graphical user interface 116 may include a data input interface that receives user input 122 generated by user input device 124 in computer system 111. Graphical user interface 116 may also include a graphic rendering engine that draws and re-draws pie charts 112 on one or more display devices.

In the illustrative example, pie chart system 108 provides access to information 104 in different forms. For example, the access may be selected from at least one of reading, writing, or modifying information 104. As depicted, this access is facilitated through the use of pie charts 112 displayed in graphical user interface 116.

In one illustrative example, pie chart system 108 in computer system 111 displays pie charts 112 in graphical user interface 116 in display system 118. As depicted, pie charts 112 have sections 126 that represent pieces 128 of information 104, and each of pie charts 112 represents type 130 of information 104 in types 132 of information 104. Each section in sections 126 may be referred to as a slice of a pie chart in pie charts 112.

As depicted, pie chart system 108 receives user input 122 selecting portion 134 of sections 126 from pie charts 112 displayed in graphical user interface 116. Pie chart system 108 displays new pie chart 136 in graphical user interface 116 using portion 134 of sections 126 selected by user input 122.

In this illustrative example, new pie chart 136 has new sections 138 representing selected pieces 140 of information 104 corresponding to portion 134 of sections 126. New sections 138 have a number of sizes 142 based on policy 144. The number of sizes 142 for new sections 138 indicates relative values 146 of pieces 128 of information 104 to each other in new pie chart 136. In this illustrative example, new pie chart 136 enables visually accessing information 104 by operator 120.

As used herein, "a number of," when used with reference to items, means one or more items. For example, "the number of sizes 142" is one or more sizes 142.

Policy 144 is a number of rules. Policy 144 also may include data or information needed to apply the rules in identifying the number of sizes 142 for new sections 138.

In one illustrative example, policy 144 may state that the number of sizes 142 for new sections 138 should all be the same. In this manner, operator 120 may adjust the number of sizes 142 for new sections 138 after creation of new pie chart 136. In another example, policy 144 may state that the number of sizes 142 may be based on relative values 146 of selected pieces 140 that correspond to portion 134 of sections 126. In other words, the number of sizes 142 may be selected to represent relative values 146 for selected pieces 140 of information 104 in portion 134 of sections 126 that have been selected for new pie chart 136. Other type of rules may be used in addition to or in place of these rules to identify the number of sizes 142 for new sections 138.

After new pie chart 136 is displayed in graphical user interface 116, user input 122 may be received from operator 120 to change a size of new sections 138 in new pie chart 136. Changing the size of new sections 138 may occur by operator 120 changing a single new section or multiple new sections in new sections 138.

In the illustrative example, changing the size of new sections 138 in new pie chart 136 also may be based on policy 144. The policy may apply rules on how sizes 142 in new sections 138 may be changed by user input 122. For example, policy 144 may include a rule on how other new sections in new sections 138 change when one new section in new sections 138 is changed by user input 122.

In this illustrative example, operator 120 may combine, change, read, view, and otherwise access pieces 128 of information 104. As shown in this example, pieces of information 104 may be more easily accessed through the visualization provided through at least one of pie charts 112 or new pie chart 136 in graphical user interface 116.

Thus, operator 120 may more quickly and easily comprehend and analyze information 104. As a result, operator 120 may perform operations more quickly, and more accurately with respect for organization 106. These operations include, for example, at least one of hiring employees, assigning projects, performing employee reviews, financial analysis, product research, product design, or other suitable operations for organization 106.

As a result, computer system 111 operates as a special purpose computer system in which pie chart system 108 in computer system 111 enables accessing information 104 stored in information system 102. With pie chart system 108 and graphical user interface 116, and the display of at least one of pie charts 112 or new pie chart 136, information 104 may be manipulated through user input 122 by operator 120 more easily as compared to using a database system, spreadsheets, or other currently available types of systems. For example, information 104 may be selected, combined, or otherwise manipulated using pie chart system 108 and graphical user interface 116. In particular, pie chart system 108 transforms computer system 111 into a special purpose computer system as compared to currently available general computer systems that do not have pie chart system 108.

Computer system 111 performs a transformation of data such as information 104 in a format for storage in database 110 to a format for display as pie charts 112 in graphical user interface 116 in display system 118. This transformation changes information 104 from the first format to the second format such that information 104 has a different function or has a different use when displayed in the form of pie charts 112 in graphical user interface 116 in display system 118 as compared to the format when stored in database 110.

The illustration of information environment 100 and the different components in FIG. 1 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, information 104 accessed by pie chart system 108 is shown to be in database 110 in information system 102. In other illustrative examples, information 104 may be located in other sources. For example, information 104 may be found in one or more databases in addition to database 110. In yet another illustrative example, information 104 may also be found in one or more information systems in addition to or in place of information system 102.

For example, pie chart system 108 may obtain pieces 128 of information 104 from a research database and a product database to generate new product information. For example, pieces 128 of information 104 about research and products may be obtained from these two databases and displayed as sections 126 in pie charts 112. New pie chart 136 may combine pieces 128 of information 104 from these two databases that are displayed as new sections 138 in new pie chart 136.

In yet another example, pieces 128 of information 104 may be located in a human resources information system and a financial system. This information may be accessed by pie chart system 108 to display pie charts 112 having sections 126 that represent pieces 128 of information 104.

In this manner, information 104 may include one or more data sets, databases, rich site summary (RSS) feeds, or other data structures or hierarchies that organize information 104. Pie chart system 108 may access information 104 as organized using these and other organizational constructs in providing operator 120 access to information 104.

Figure 2:
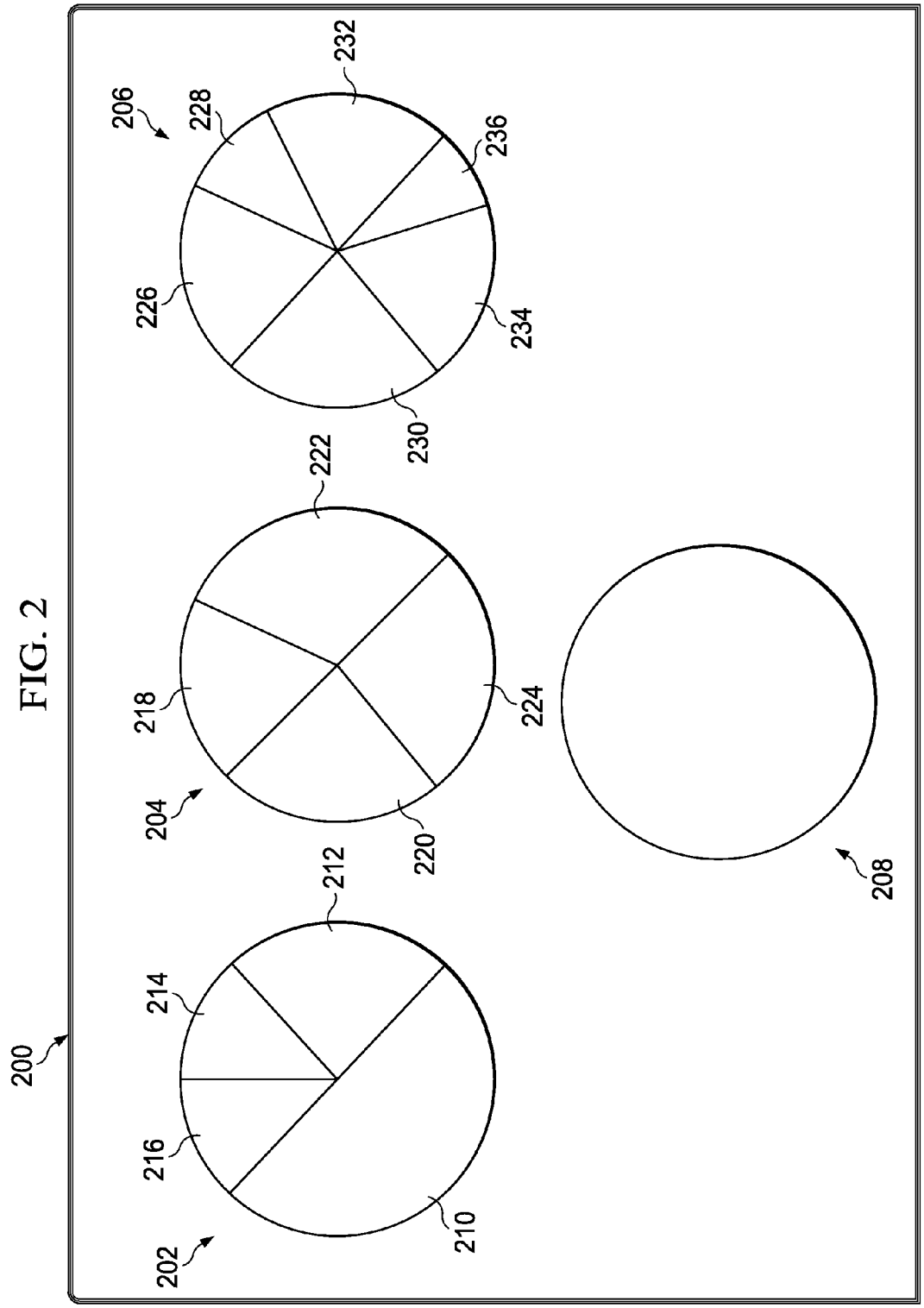
FIG. 2 is an illustration of a graphical user interface displaying information with pie charts in accordance with an illustrative embodiment.

FIGS. 2-17 are illustrative examples of graphical user interfaces that may be used to interact with a pie chart system to visually access information. With reference first to FIG. 2, an illustration of a graphical user interface displaying information with pie charts is depicted in accordance with an illustrative embodiment. Graphical user interface 200 is an example of one implementation for graphical user interface 116 shown in block form in FIG. 1.

In the illustrative examples, the same reference numeral may be used in more than one figure. This reuse of a reference numeral in different figures represents the same element in the different figures.

As depicted, graphical user interface 200 shows pie chart 202, pie chart 204, and pie chart 206. Pie chart 202, pie chart 204, and pie chart 206 are examples of pie charts 112 shown in block form in FIG. 1. Graphical user interface 200 also shows new pie chart 208. New pie chart 208 is an example of new pie chart 136 shown in block form in FIG. 1. The pie charts shown in graphical user interface 200 represent types 132 of information 104 shown in block form in FIG. 1. In the depicted example, each pie chart shows a type of information 104 in types 132. With the display of these pie charts, graphical user interface 200 enables visually accessing information 104 by operator 120.

In this illustrative example, a type of information in types 132 of information 104 in FIG. 1 is shown in each of pie chart 202, pie chart 204, and pie chart 206. These pie charts have sections that represent pieces 128 of information 104. As depicted, pie chart 202 includes section 210, section 212, section 214, and section 216; pie chart 204 includes section 218, section 220, section 222, and section 224; and pie chart 206 includes section 226, section 228, section 230, section 232, section 234, and section 236.

In this depicted example, new pie chart 208 does not include any sections. In other words, new pie chart 208 is empty.

As depicted, the sizes of the sections in pie chart 202, pie chart 204, and pie chart 206 are based on relative values 146 for pieces 128 of information 104 in FIG. 1. For example, the sizes of the sections in these pie charts may be set using the values in pieces 128 of information 104.

In this illustrative example, these values in pieces 128 of information 104 may be selected from at least one of a measure of time demonstrating a type of work experience, a level of mastery for a type of work experience, or other suitable types of values in pieces 128 of information 104 for a type of work experience. These values in pieces 128 of information 104 are at least one of self-identified, supervisor identified, test result identified, or identified through other suitable ways of identifying relative values for different types of work experience.

For example, pie chart 202 may be for types of work experience of a particular employee. In this example, each section in pie chart 202 is based on relative values 146 for a type of work experience of the particular employee. More particularly, relative values 146 for each section are a total amount of work experience in pieces 128 of information for a particular type of work experience. For example, a relative value for section 210 may be four (4) years of programming experience and a relative value for section 212 may be two (2) years of testing experience. In this example, the values are relative to each other based on years of experience.

Thus, graphical user interface 200 enables visually accessing relative values 146 of pieces 128 of information 104 for types 132 of information displayed in pie chart 202, pie chart 204, and pie chart 206. For example, graphical user interface 200 enables visually accessing relative values 146 for the different types of work experience displayed in pie chart 202, pie chart 204, and pie chart 206.

Figure 3:
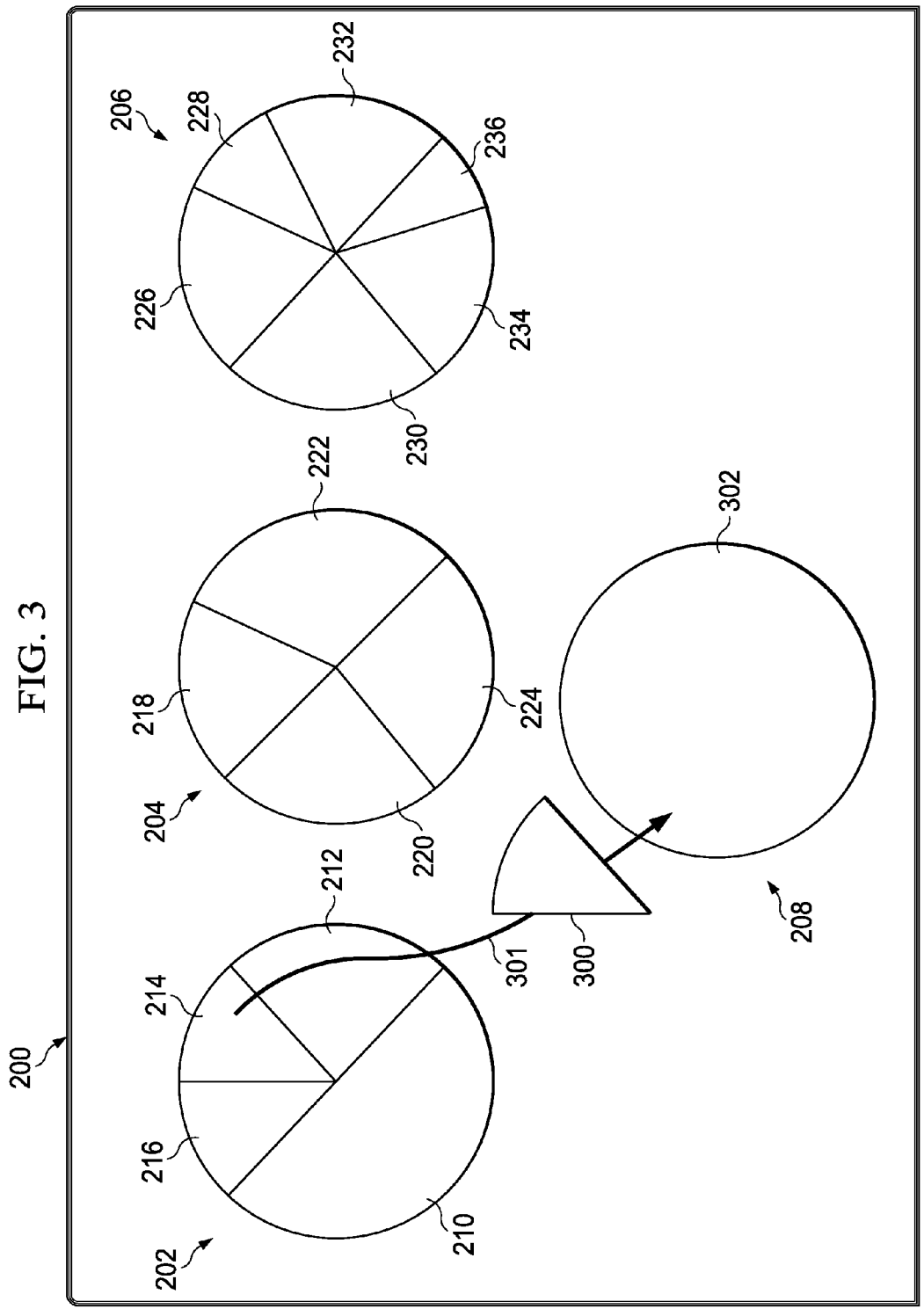
FIG. 3 is an illustration of a graphical user interface with a new section added to a new pie chart in accordance with an illustrative embodiment.

Turning next to FIG. 3, an illustration of a graphical user interface with a new section added to a new pie chart is depicted in accordance with an illustrative embodiment. In this illustrative example, user input selecting section 214 in pie chart 202 has been received.

As depicted, the user input includes moving copy 300 of section 214 in the direction of arrow 301. Moving copy 300 in the direction of arrow 301 moves copy 300 of section 214 into new pie chart 208. As used herein, a copy of a section of a pie chart is a graphical representation of the section. For example, copy 300 of section 214 of pie chart 202 is a graphical representation of section 214.

In the depicted example, copy 300 may be used to perform a number of operations. For example, copy 300 may be moved to pie chart 204 by a drag and drop operation. As another example, copy 300 may be moved from one location of pie chart 202 to another location in pie chart 202 by a drag and drop operation.

In this illustrative example, the user input moving copy 300 of section 214 in the direction of arrow 301 is a drag and drop operation. Graphical user interface 200 shows new section 302 in new pie chart 208 when the user input is received. New section 302 represents section 214.

As depicted, the size of new section 302 in new pie chart 208 is the size of new pie chart 208. In other words, new section 302 takes up all of the room in new pie chart 208. Graphical user interface 200 shows the size of new section 302 as the size of new pie chart 208 based on a rule in policy 144 for setting the size of a section of a pie chart to the size of the pie chart when the section is the only section in the pie chart.

Figure 4:
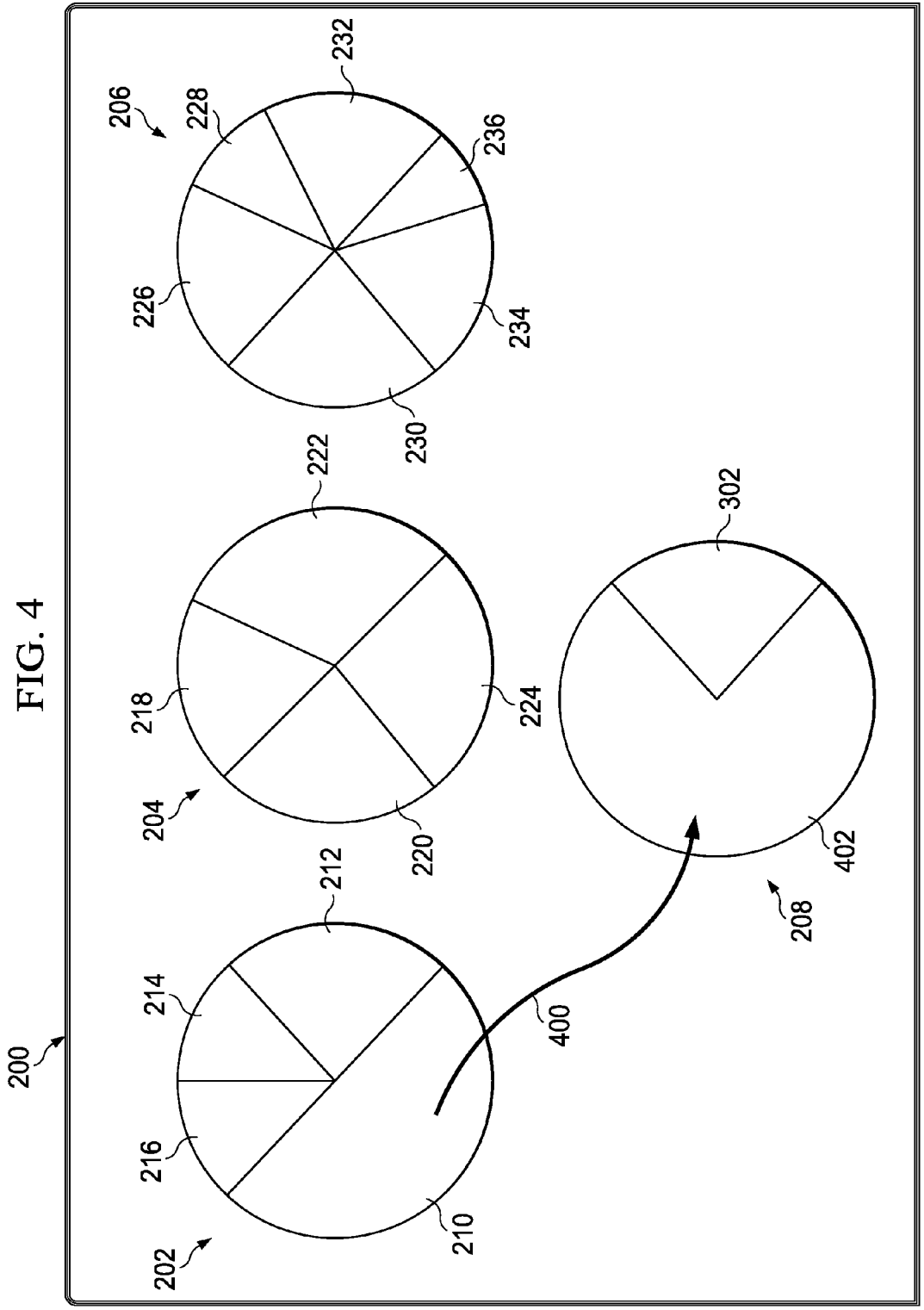
FIG. 4 is an illustration of a graphical user interface with a new section added to a new pie chart in accordance with an illustrative embodiment.

Turning now to FIG. 4, an illustration of a graphical user interface with a new section added to a new pie chart is depicted in accordance with an illustrative embodiment. In this illustrative example, user input selecting section 210 in pie chart 202 has been received.

As depicted, the user input includes moving a copy of section 210 in the direction of arrow 400. Moving the copy of section 210 in the direction of arrow 400 moves the copy of section 210 into new pie chart 208. For example, the user input may be part of a group of drag and drop operations that moves sections into new pie chart 208. The user input selecting section 214 and section 210 as a portion of sections from pie chart 202 is an example of user input 122 selecting portion 134 of sections 126 from pie charts 112 shown in block form in FIG. 1.

Graphical user interface 200 shows new section 402 in new pie chart 208 when the user input is received. New section 402 represents section 210. New section 402 and new section 302 in new pie chart 208 are examples of new sections 138 shown in block form in FIG. 1. The size of new section 402 and the size of new section 302 in new pie chart 208 are examples of the number of sizes 142 shown in block form in FIG. 1.

In this depicted example, the size of new section 402 and the size of new section 302 are based on a rule in policy 144 for setting sizes of sections in a pie chart based on relative values 146 for the sections.

Figure 5:
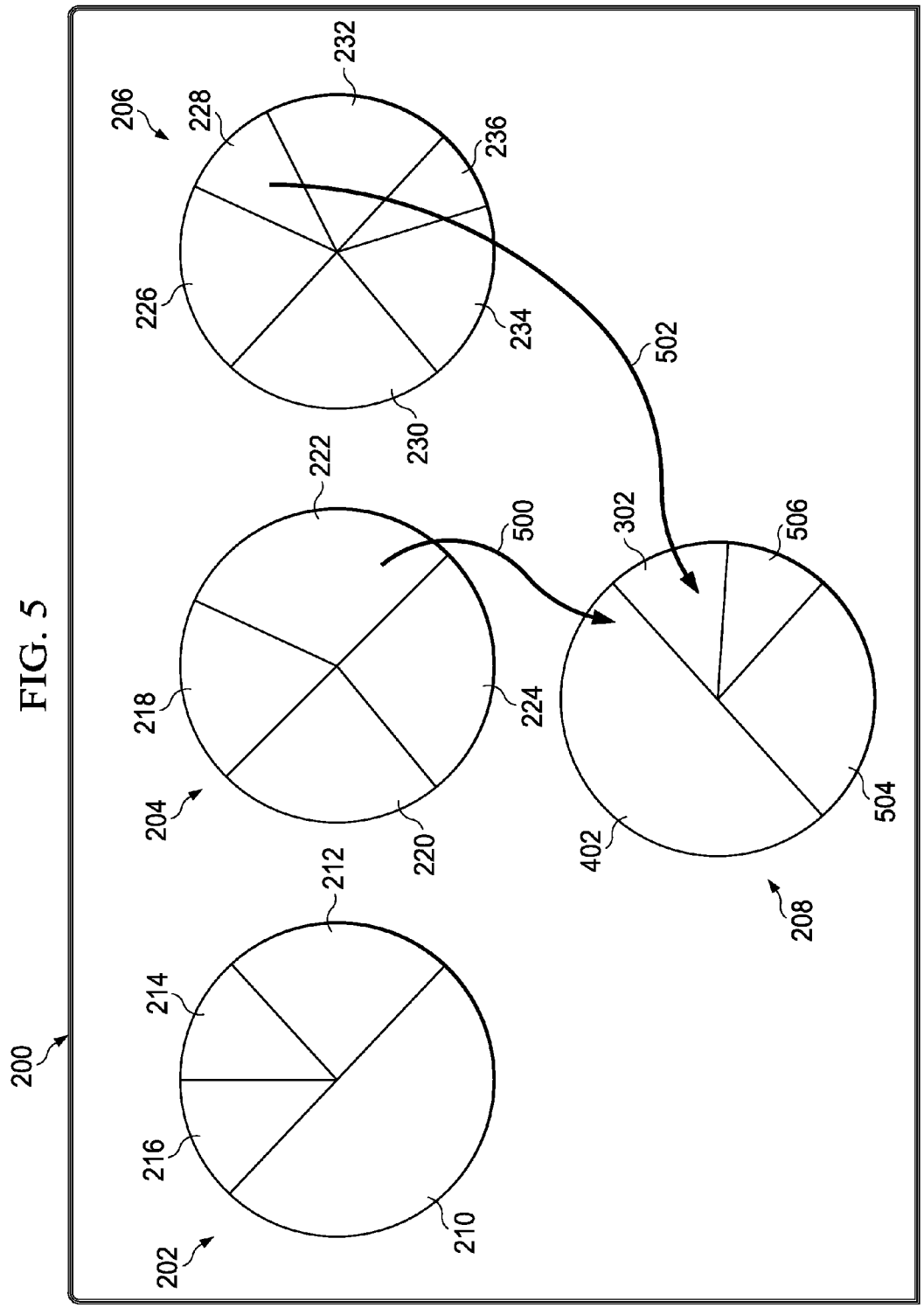
FIG. 5 an illustration of a graphical user interface with new sections added to a new pie chart in accordance with an illustrative embodiment.

Turning next to FIG. 5, an illustration of a graphical user interface with new sections added to a new pie chart is depicted in accordance with an illustrative embodiment. In this illustrative example, user input selecting section 222 in pie chart 204 and section 228 in pie chart 206 has been received.

As depicted, the user input includes moving a copy of section 222 in the direction of arrow 500. Moving the copy of section 222 in the direction of arrow 500 moves the copy of section 222 into new pie chart 208. The user input also includes moving a copy of section 228 in the direction of arrow 502. Moving the copy of section 228 in the direction of arrow 502 moves the copy of section 228 into new pie chart 208.

For example, the user input may be part of a group of drag and drop operations that moves sections into new pie chart 208. The user input selecting section 214, section 210, section 222, and section 228 as a portion of sections from pie chart 202, pie chart 204, and pie chart 206 is an example of user input 122 selecting portion 134 of sections 126 from pie charts 112 shown in block form in FIG. 1.

Graphical user interface 200 shows new section 504 in new pie chart 208 when the copy of section 222 is moved into new pie chart 208. New section 504 represents section 222. Graphical user interface 200 also shows new section 506 in new pie chart 208 when the copy of section 228 is moved into new pie chart 208. New section 506 represents section 228. New section 402, new section 302, new section 504, and new section 506 in new pie chart 208 are examples of new sections 138 shown in block form in FIG. 1. The sizes of these sections in new pie chart 208 are examples of the number of sizes 142 shown in block form in FIG. 1.

In this depicted example, the sizes of these sections in new pie chart 208 are based on a rule in policy 144 for setting sizes of sections in a pie chart based on relative values 146 for the sections.

Figure 6:
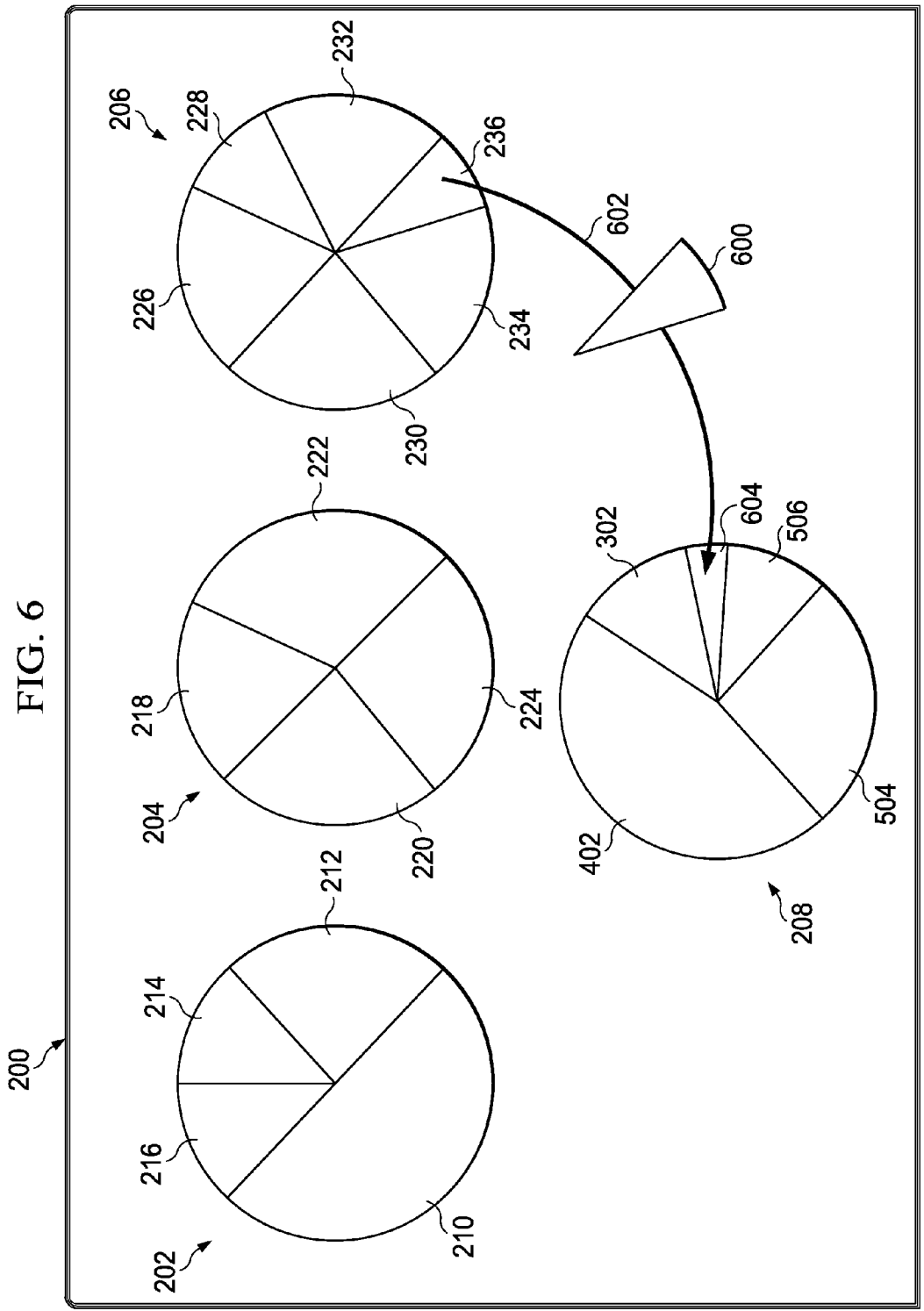
FIG. 6 is an illustration of a graphical user interface with a new section added to a new pie chart in accordance with an illustrative embodiment.

Turning to FIG. 6, an illustration of a graphical user interface with a new section added to a new pie chart is depicted in accordance with an illustrative embodiment. In this illustrative example, user input has been received that selects section 236 in pie chart 206.

As depicted, the user input includes moving copy 600 of section 236 in the direction of arrow 602. Moving copy 600 in the direction of arrow 602 causes copy 600 of section 236 to be moved into new pie chart 208.

For example, the user input may be part of a group of drag and drop operations that moves sections into new pie chart 208. In this example, copy 600 may be displayed moving along arrow 602 in graphical user interface 200 as the user input for the drag and drop operation is being received.

The user input selecting section 214, section 210, section 222, section 228, and section 236 as a portion of sections from pie chart 202, pie chart 204, and pie chart 206 is an example of user input 122 selecting portion 134 of sections 126 from pie charts 112 shown in block form in FIG. 1.

Graphical user interface 200 shows new section 604 in new pie chart 208 when the user input is received. New section 604 represents section 236. New section 402, new section 302, new section 504, new section 506, and new section 604 in new pie chart 208 are examples of new sections 138 shown in block form in FIG. 1. The sizes of these sections in new pie chart 208 are examples of the number of sizes 142 shown in block form in FIG. 1. In this depicted example, the sizes of these sections in new pie chart 208 are based on a rule in policy 144 for setting sizes of sections in a pie chart based on relative values 146 for the sections.

Figure 7:
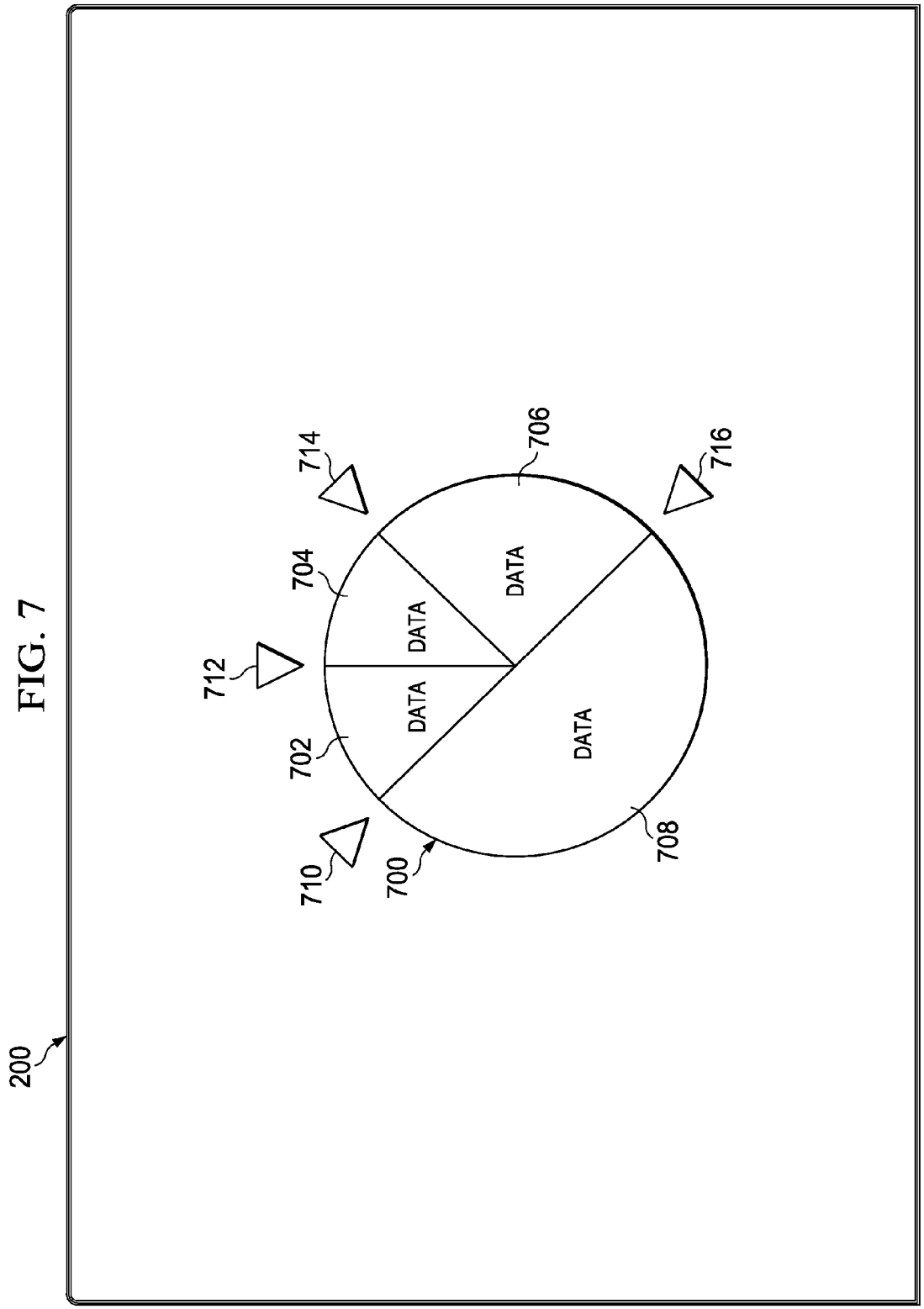
FIG. 7 is an illustration of a pie chart with graphical handles in a graphical user interface in accordance with an illustrative embodiment.

With reference to FIG. 7, an illustration of a pie chart with graphical handles in a graphical user interface is depicted in accordance with an illustrative embodiment. As depicted, graphical user interface 200 shows pie chart 700. Pie chart 700 is an example of a pie chart in pie charts 112 shown in block form in FIG. 1.

In this illustrative example, a type of information in types 132 of information 104 in FIG. 1 is shown in pie chart 700. As depicted, pie chart 700 includes sections for a portion of pieces 128 of information 104. The sections of pie chart 700 shown in this example include data section 702, data section 704, data section 706, and data section 708. In this illustrative example, the sections in pie chart 700 represent values located in pieces 128 of information 104 in FIG. 1.

As depicted, the sizes of the sections in pie chart 700 are based on relative values 146 to each other for values in pieces 128 of information 104. In the depicted example, the values located in pieces 128 of information 104 are at least one of measures of time, quantities of a type of material, quality of a type of material, values for components of a product, levels of mastery for a type of work experience, or other suitable types of values in pieces 128 of information 104.

In the depicted example, graphical user interface 200 enables visually accessing relative values 146 for values in pieces 128 of information 104 for types 132 of information displayed in pie chart 700. For example, graphical user interface 200 enables visually accessing relative values 146 for the different values in pieces 128 of information 104 represented by the sections displayed in pie chart 700.

As depicted, graphical handle 710, graphical handle 712, graphical handle 714, and graphical handle 716 are shown in graphical user interface 200. These graphical handles may be used by operator 120 to provide user input to change the sizes of the sections in pie chart 700. In this illustrative example, the values in pieces 128 of information 104 represented by the sections in pie chart 700 are changed when user input is received changing relative sizes of these sections.

In the depicted example, a graphical indicator may be used to identify whether types of changes to sizes of the sections are allowed. For example, graphical handle 710 may include an indicator for whether a change to a linear or angular direction is supported. In this illustrative example, the indicator for whether types of changes to sizes of the sections are allowed for graphical handle 710 is at least one of a color shown on graphical handle 710, a pattern shown on graphical handle 710, an icon displayed in association with graphical handle 710, or other suitable types of indication that graphical handle 710 is moveable.

Figure 8:
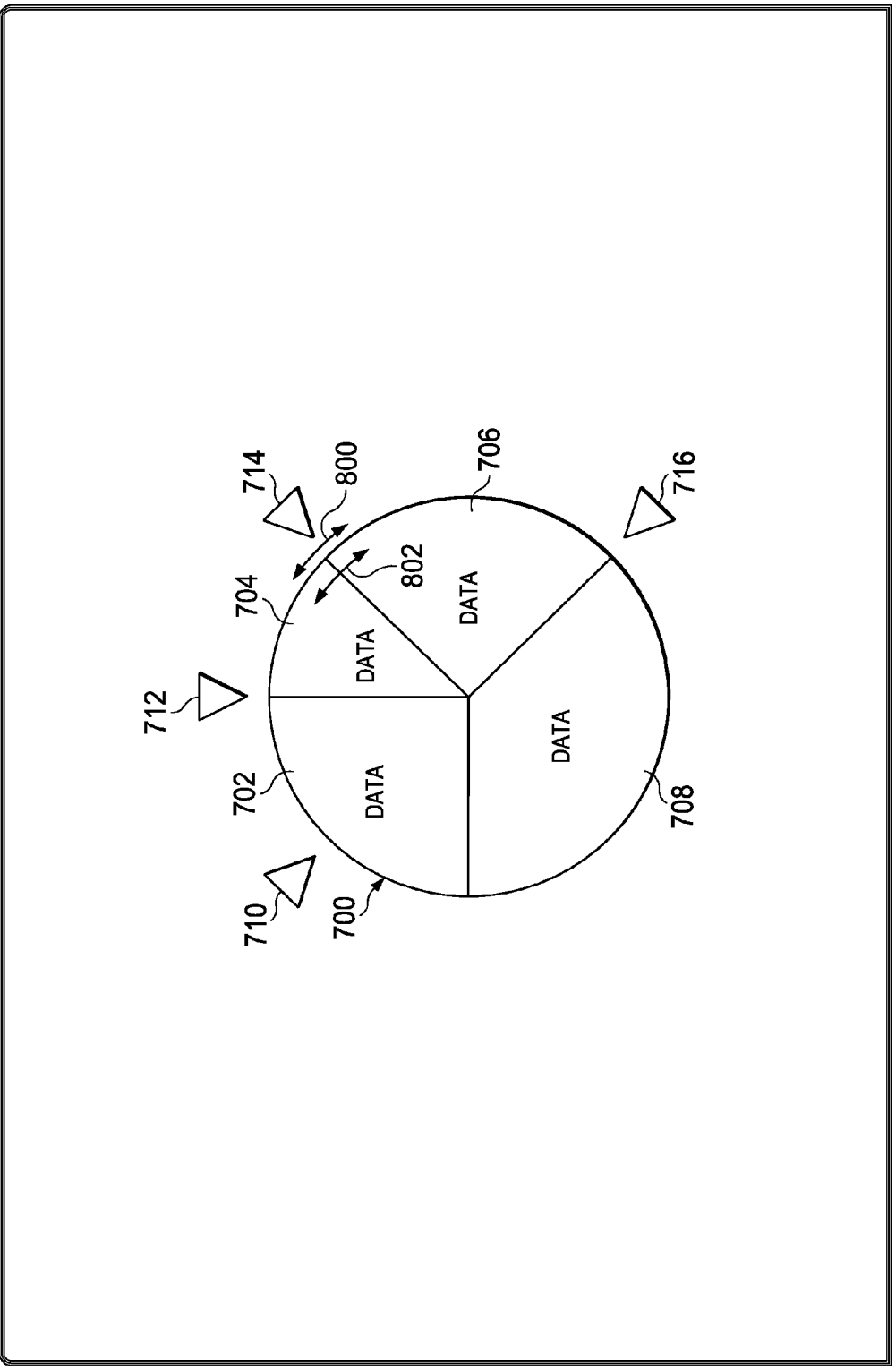
FIG. 8 is an illustration of modifying sizes of sections in a pie chart in a graphical user interface in accordance with an illustrative embodiment.

With reference next to FIG. 8, an illustration of modifying sizes of sections in a pie chart in a graphical user interface is depicted in accordance with an illustrative embodiment. In this illustrative example, user input moving graphical handle 714 in the direction of arrow 800 has been received. The direction of arrow 800 is a linear direction with respect to the outside edge of pie chart 700.

As depicted, the sizes of data section 704 and data section 706 in pie chart 700 are modified in the direction of arrow 802 based on user input that moves graphical handle 714 in the direction of arrow 800. In this depicted example, the values in pieces 128 of information 104 represented by data section 704 and data section 706 are changed when the user input changes the sizes of data section 704 and data section 706.

Figure 9:
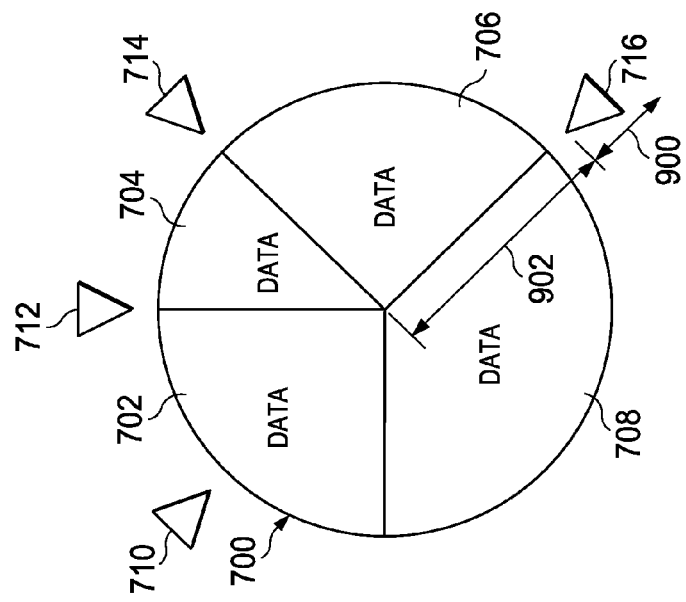
FIG. 9 is an illustration showing the modification of the radius of a pie chart in accordance with an illustrative embodiment.

With reference next to FIG. 9, an illustration showing the modification of the radius of a pie chart is depicted in accordance with an illustrative embodiment. In this illustrative example, user input moving graphical handle 716 in the direction of arrow 900 has been received. The direction of arrow 900 is an angular direction with respect to the displayed diameter of pie chart 700.

As depicted, the radius of pie chart 700 is modified in the direction of arrow 902 based on user input that moves graphical handle 716 in the direction of arrow 900.

Figure 10:
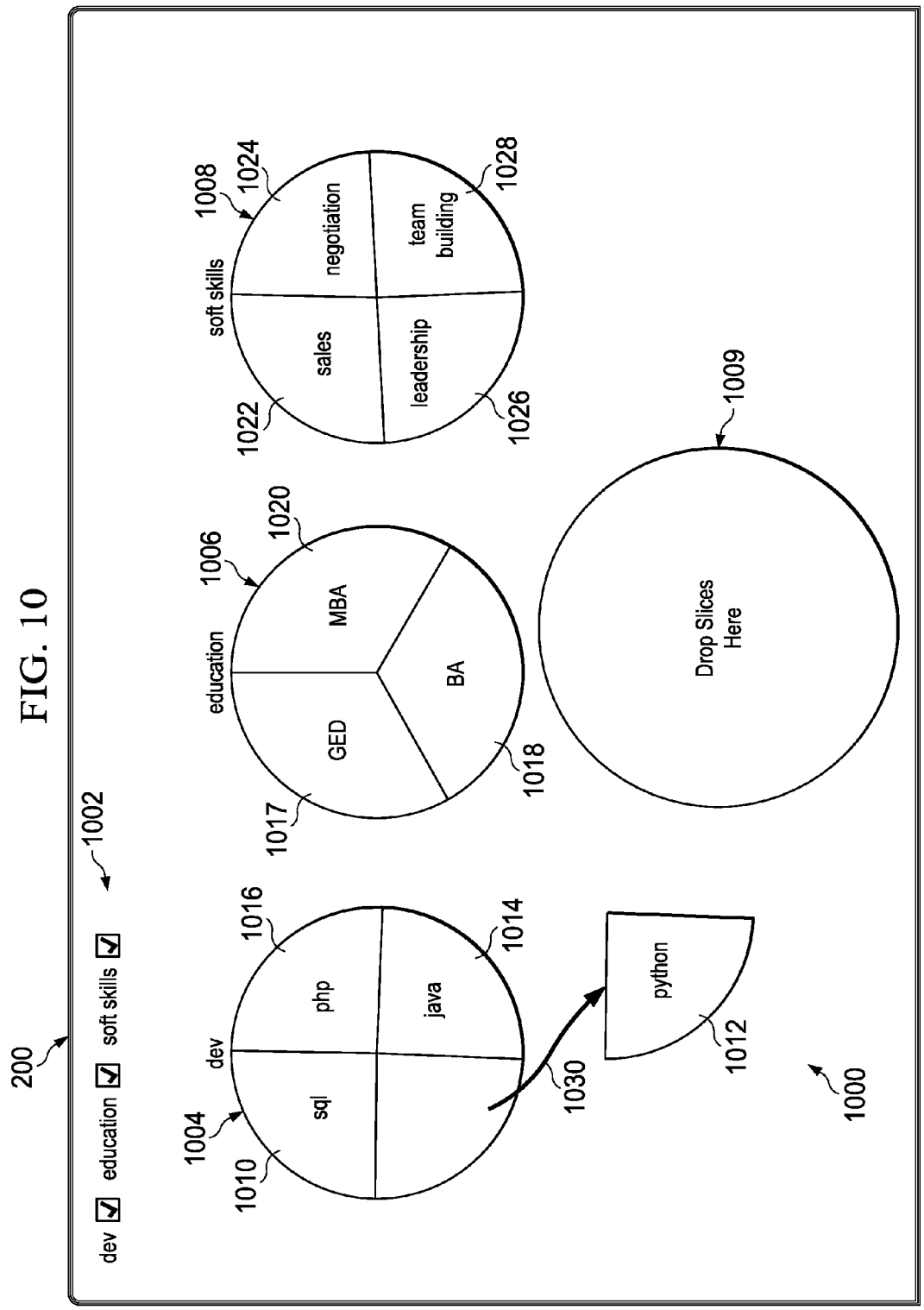
FIG. 10 is an illustration of a graphical user interface accessing information with pie charts in accordance with an illustrative embodiment.

With reference now to FIG. 10, an illustration of a graphical user interface accessing information with pie charts is depicted in accordance with an illustrative embodiment. As depicted, graphical user interface 200 shows options 1002 for selecting which types of skills are displayed as pie charts in graphical user interface 200.

In the depicted example, the types of skills in options 1002 selected include developer skills, education, and soft skills. As depicted, pie chart 1004 is for types of developer skills based on the selection of developer skills in options 1002; pie chart 1006 is for types of education based on the selection of developer skills in options 1002; and pie chart 1008 is for types of soft skills in graphical user interface 200 based on the selection of soft skills in options 1002.

Pie chart 1004, pie chart 1006, and pie chart 1008 are examples of pie charts 112 shown in block form in FIG. 1. New pie chart 1009 is also shown in Graphical user interface 200. New pie chart 1009 is an example of new pie chart 136 shown in block form in FIG. 1.

In this illustrative example, a type of information in types 132 of information 104 in FIG. 1 is shown in each of pie chart 1004, pie chart 1006, and pie chart 1008. These pie charts have sections that represent pieces 128 of information 104. As depicted, pie chart 1004 includes section 1010 for structured query language (SQL), section 1012 for python, section 1014 for Java, and section 1016 for hypertext preprocessor (PHP); pie chart 1006 includes section 1017 for general education development (GED), section 1018 for bachelors of arts, and section 1020 for masters of business administration; and pie chart 1008 includes section 1022 for sales, section 1024 for negotiation, section 1026 for leadership, and section 1028 for team building. New pie chart 1009 does not include sections, in this depicted example.

As depicted, the sizes of the sections in pie chart 1004, pie chart 1006, and pie chart 1008 are based on relative values 146 for pieces 128 of information 104 in FIG. 1. For example, the sizes of the sections in pie chart 1004, pie chart 1006, and pie chart 1008 may be set using the values for pieces 128 of information 104. In this illustrative example, these values in pieces 128 of information 104 may be selected from at least one of a measure of time demonstrating a type of skill, a level of mastery for a type of skill, or other suitable types of values in pieces 128 of information 104 for a type of skill.

In this illustrative example, section 1012 is moved out of pie chart 1004 in response to a user input. As depicted, the user input moving section 1012 out of pie chart 1004 includes moving section 1012 in the direction of arrow 1030.

Thus, graphical user interface 200 enables visually accessing relative values 146 of types of skills in pieces 128 of information 104 for types 132 of information displayed in pie chart 1004, pie chart 1006, and pie chart 1008. For example, graphical user interface 200 enables visually accessing relative values 146 for the different types of skills displayed in pie chart 1004, pie chart 1006, and pie chart 1008.

Figure 11:
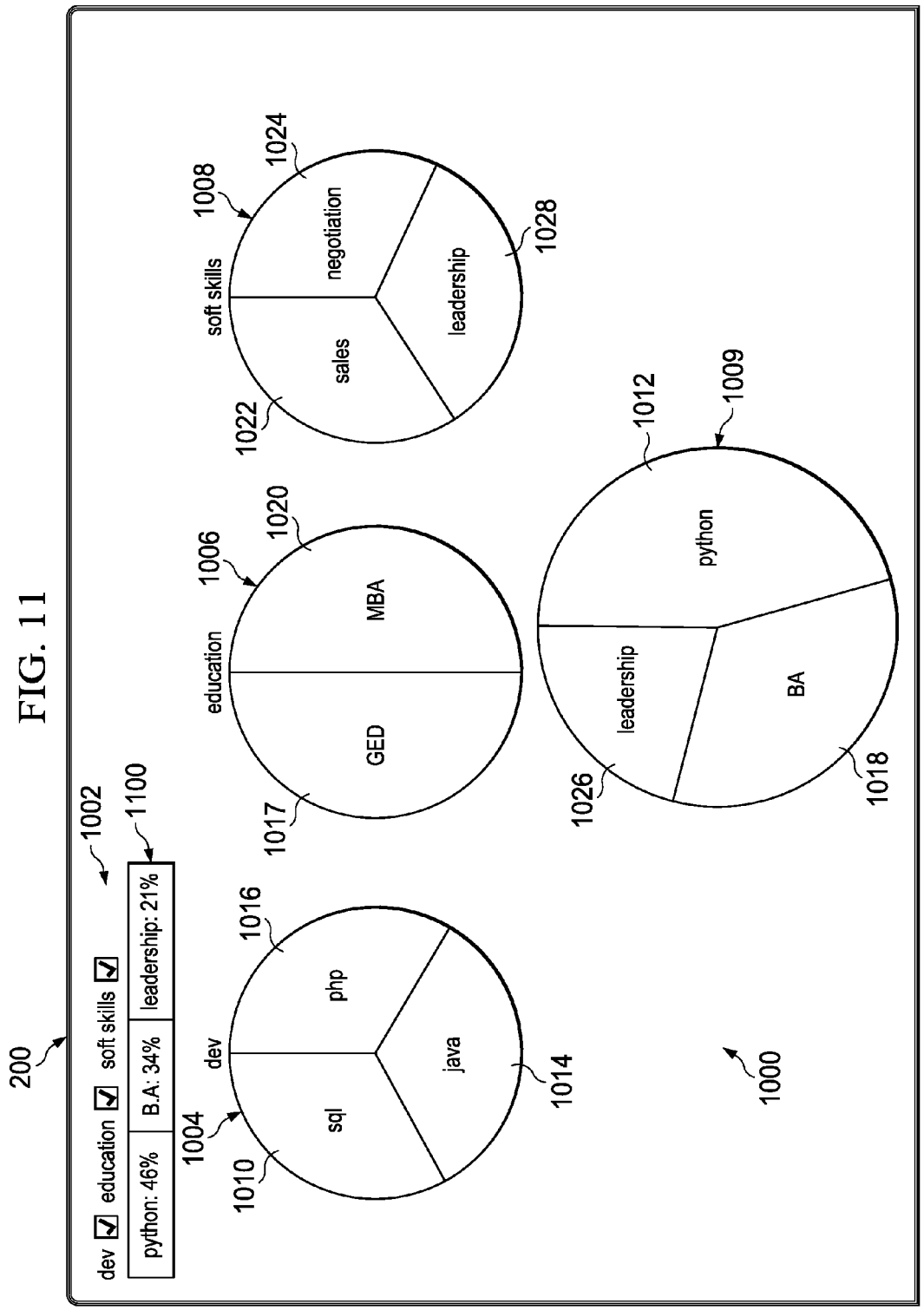
FIG. 11 is an illustration of a graphical user interface accessing information with pie charts in accordance with an illustrative embodiment.

With reference now to FIG. 11, an illustration of a graphical user interface accessing information with pie charts is depicted in accordance with an illustrative embodiment. As depicted, indicator 1100 is shown in graphical user interface 200. In the depicted example, indicator 1100 is a table showing percentages for the sizes of sections in new pie chart 1009. These percentages show relative values 146 for the types of skills in the sections in new pie chart 1009. These percentages represent relative importance of the types of skills to each other.

In the illustrative example, user input has been received moving section 1012 from pie chart 1004 to new pie chart 1009, section 1026 from pie chart 1008 to new pie chart 1009, and section 1018 from pie chart 1006 to new pie chart 1009. As depicted, the sizes of the sections in pie chart 1004, pie chart 1006, pie chart 1008, and new pie chart 1009 are adjusted based on a rule in policy 144 for setting sizes of sections in a pie chart. In the depicted example, the rule is for setting sizes of sections based on relative values 146 for the sections. Thus, graphical user interface 200 enables visually accessing relative values 146 for the different types of skills displayed in pie chart 1004, pie chart 1006, pie chart 1008, and new pie chart 1009.

Figure 12:
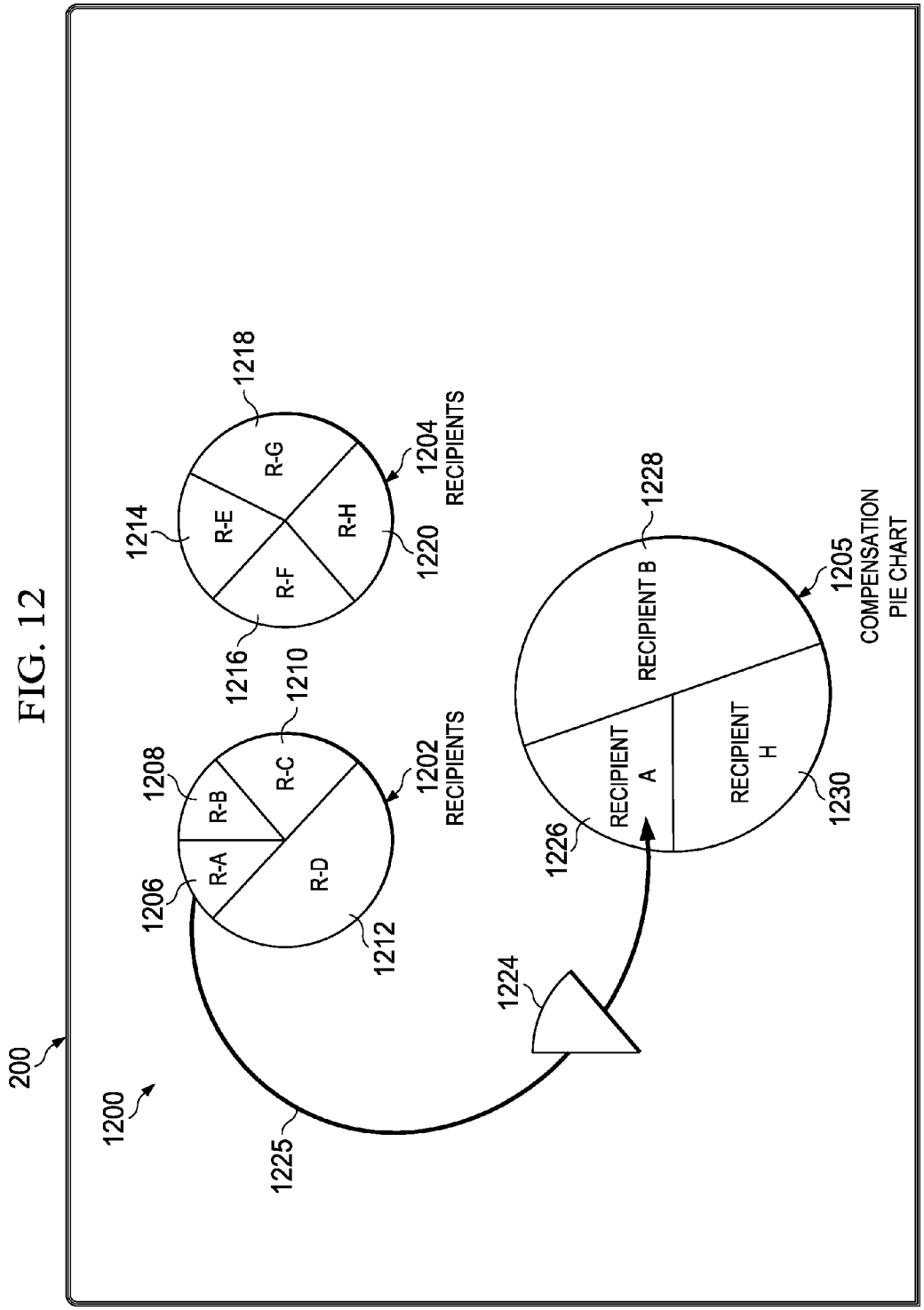
FIG. 12 is an illustration of a graphical user interface accessing information with pie charts in accordance with an illustrative embodiment.

Turning now to FIG. 12, an illustration of a graphical user interface accessing information with pie charts is depicted in accordance with an illustrative embodiment. As depicted, graphical user interface 200 shows pie charts 1200. In this depicted example, pie charts 1200 include sections for amounts of compensation for recipients.

In this depicted example, pie chart 1202 is for a first group of recipients and pie chart 1204 is for a second group of recipients. These recipients may be employees of an organization. Pie chart 1202 and pie chart 1204 are examples of pie charts 112 shown in block form in FIG. 1. Graphical user interface 200 also shows new pie chart 1205. New pie chart 1205 is an example of new pie chart 136 shown in block form in FIG. 1.

In this illustrative example, amounts of compensation for recipients in information 104 in FIG. 1 are shown in each of pie chart 1202 and pie chart 1204. These pie charts have sections for the compensation of recipients located in pieces 128 of information 104.

As depicted, pie chart 1202 includes section 1206 for recipient "A", section 1208 for recipient "B", section 1210 for recipient "C", and section 1212 for recipient "D"; pie chart 1204 includes section 1214 for recipient "E", section 1216 for recipient "F", section 1218 for recipient "G", and section 1220 for recipient "H". The sizes of the sections in pie chart 1202 and pie chart 1204 are based on relative values 146 for amounts of compensation of recipients in pieces 128 of information 104.

For example, the sizes of the sections in pie chart 1202 and pie chart 1204 may be set using amounts of compensation of the recipients located in pieces 128 of information 104. In this example, the amounts of compensation may be selected from at least one of periodic compensation, benefits, bonuses, or other suitable types of compensation for employees of an organization.

In this depicted example, user input is received that moves copy 1224 of section 1206 into new pie chart 1205. As depicted, this user input moves copy 1224 in the direction of arrow 1225. Section 1226 in new pie chart 1205 is a copy of section 1206. As depicted, section 1228 is a copy of section 1208 and section 1230 is a copy of section 1220.

Thus, graphical user interface 200 enables visually accessing relative amounts of compensation in relative values 146 for compensation for recipients in pieces 128 of information 104 in pie charts 1200. For example, graphical user interface 200 enables visually accessing relative values 146 for the different amounts of compensation for the different recipients displayed in pie chart 1202, pie chart 1204, and new pie chart 1205.

Figure 13:
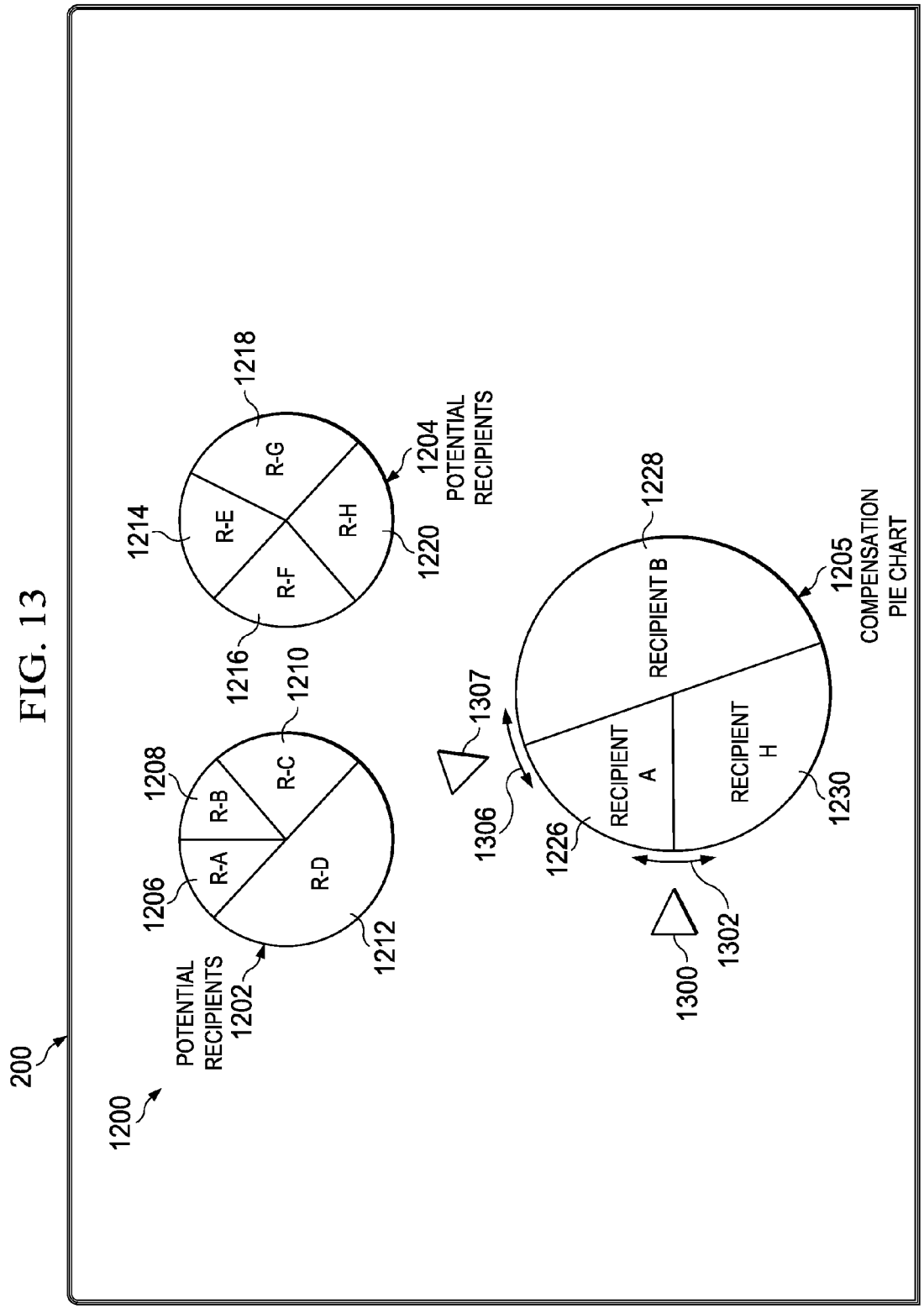
FIG. 13 is an illustration of modifying sizes of sections in a pie chart in a graphical user interface in accordance with an illustrative embodiment.

Turning next to FIG. 13, an illustration of modifying sizes of sections in a pie chart in a graphical user interface is depicted in accordance with an illustrative embodiment. In this illustrative example, user input has been received that moves graphical handle 1300 in the direction of arrow 1302.

As depicted, user input that moves graphical handle 1300 in the direction of arrow 1302 modifies the sizes of section 1226 and section 1230 in new pie chart 1205 in the direction of arrow 1302. The values for compensation for recipients in pieces 128 of information 104 represented by section 1226 and section 1230 are changed responsive to the user input changing the sizes of section 1226 and section 1230.

The sizes of section 1226 and section 1228 in new pie chart 1205 are changed in the direction of arrow 1306 based on additional user input that moves graphical handle 1307 in the direction of arrow 1306. The amounts of compensation for the recipients in pieces 128 of information 104 are changed responsive to the additional user input that changes the sizes of section 1226 and section 1228.

Figure 14:
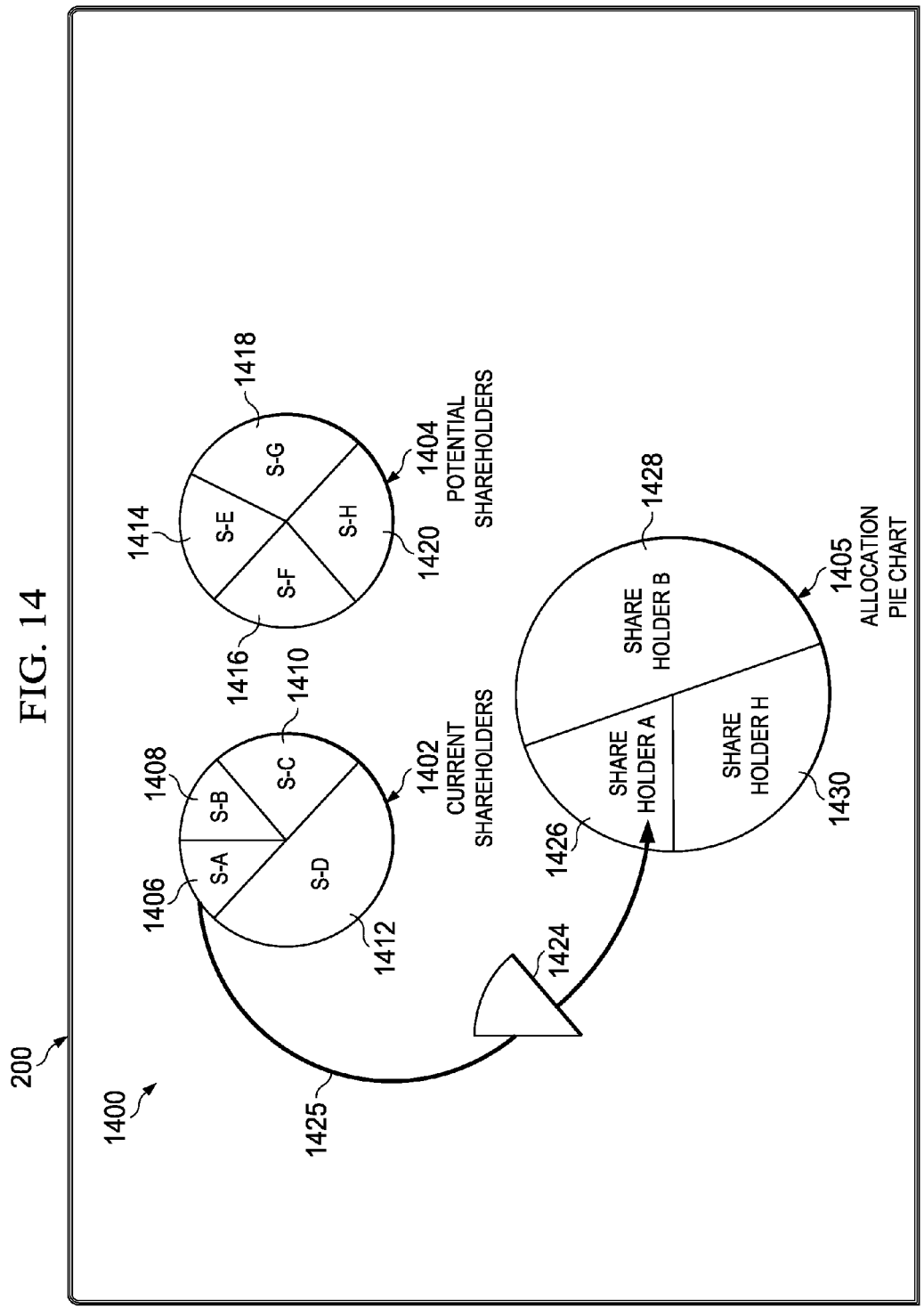
FIG. 14 is an illustration of a graphical user interface accessing information with pie charts in accordance with an illustrative embodiment.

With reference to FIG. 14, an illustration of a graphical user interface accessing information with pie charts is depicted in accordance with an illustrative embodiment. As depicted, graphical user interface 200 shows a group of pie charts 1400. The group of pie charts 1400 includes sections about allocations of shares to shareholders.

In this depicted example, pie chart 1402 is for a first group of shareholders and pie chart 1404 is for a second group of shareholders. The first group of shareholders in pie chart 1402 is current shareholders and the second group of shareholders in pie chart 1404 is potential shareholders. Pie chart 1402 and pie chart 1404 are examples of pie charts 112 shown in block form in FIG. 1. Graphical user interface 200 also shows new pie chart 1405. New pie chart 1405 is an example of new pie chart 136 shown in block form in FIG. 1.

In this illustrative example, amounts of shares for shareholders in information 104 in FIG. 1 are shown in each of pie chart 1402 and pie chart 1404. These pie charts have sections for numbers of shares allocated to shareholders as identified in pieces 128 of information 104.

As depicted, pie chart 1402 includes section 1406 for shareholder "A", section 1408 for shareholder "B", section 1410 for shareholder "C", and section 1412 for shareholder "D"; pie chart 1404 includes section 1414 for shareholder "E", section 1416 for shareholder "F", section 1418 for shareholder "G", and section 1420 for shareholder "H". The sizes of the sections in pie chart 1402 and pie chart 1404 are based on relative values 146 for numbers of shares of shareholders located in pieces 128 of information 104.

For example, the sizes of the sections in pie chart 1402 and pie chart 1404 may be set using numbers of shares for shareholders located in pieces 128 of information 104. In this example, the numbers of shares may be selected from at least one of currently allocated shares, shares being purchased, options scheduled to be granted, or other suitable types of numbers of shares for shareholders.

In this depicted example, user input that moves copy 1424 of section 1406 into new pie chart 1405 has been received. As depicted, the user input moves copy 1424 in the direction of arrow 1425. Section 1426 in new pie chart 1405 is a copy of section 1406. As depicted, section 1428 is a copy of section 1408 and section 1430 is a copy of section 1420.

Thus, graphical user interface 200 enables visually accessing relative numbers of shares in relative values 146 for recipients in pieces 128 of information 104 in pie charts 1400. For example, graphical user interface 200 enables visually accessing relative values 146 for the different numbers of shares for the different shareholders displayed in pie chart 1402, pie chart 1404, and new pie chart 1405.

Figure 15:
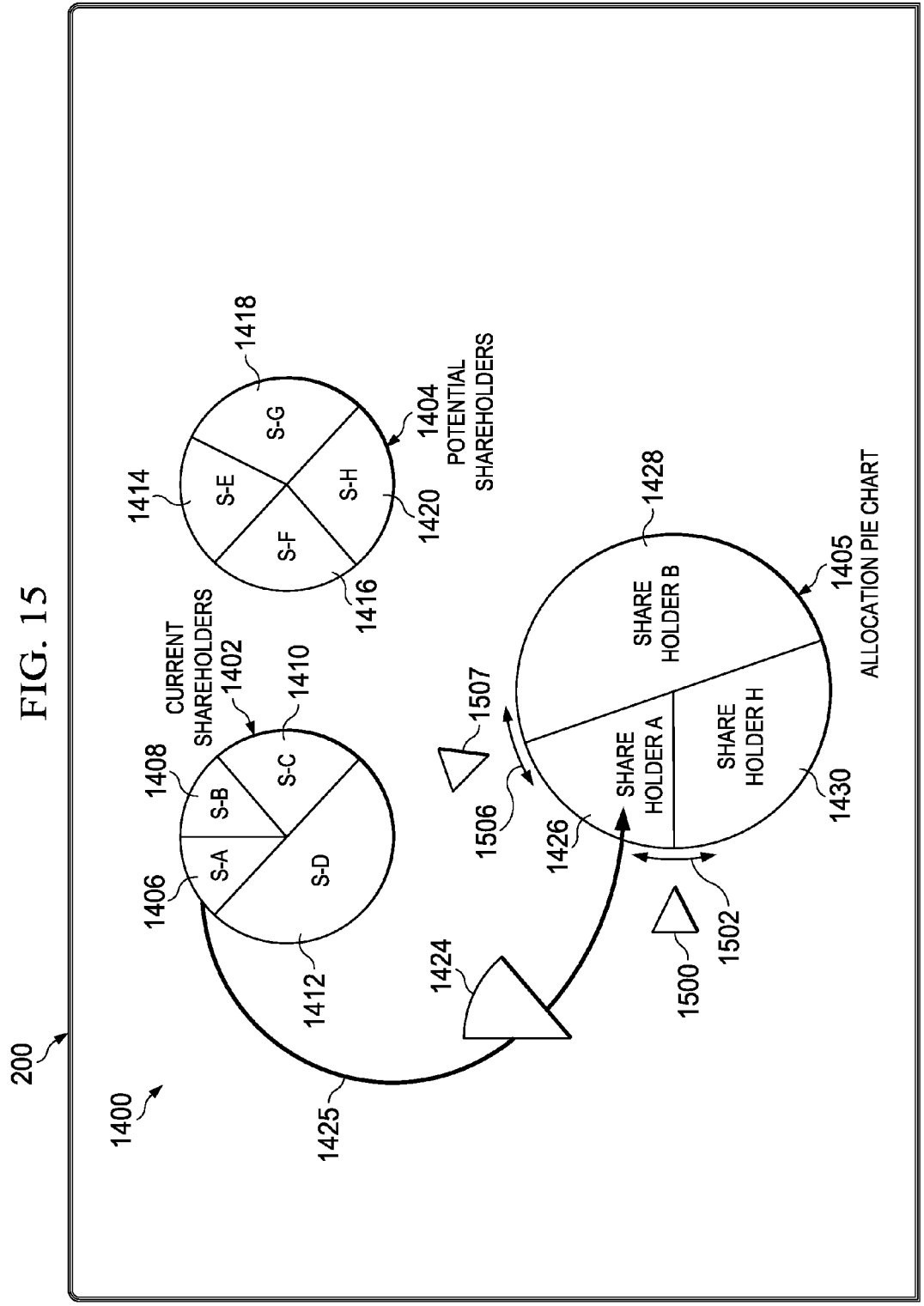
FIG. 15 is an illustration of modifying sizes of sections in a pie chart in a graphical user interface in accordance with an illustrative embodiment.

With reference next to FIG. 15, an illustration of modifying sizes of sections in a pie chart in a graphical user interface is depicted in accordance with an illustrative embodiment. In this illustrative example, user input has been received that moves graphical handle 1500 in the direction of arrow 1502.

As depicted, the sizes of section 1426 and section 1430 in new pie chart 1405 are changed in the direction of arrow 1502 based on user input that moves graphical handle 1500 in the direction of arrow 1502. The sizes of section 1426 and section 1428 are changed in the direction of arrow 1506 based on additional user input that moves graphical handle 1507 in the direction of arrow 1506. Numbers of shares allocated to shareholders in pieces 128 of information 104 are represented by section 1426, section 1428, and section 1430. These numbers of shares allocated to the shareholders in pieces 128 of information 104 are changed when user input changing the sizes of the sections is received.

Figure 16:
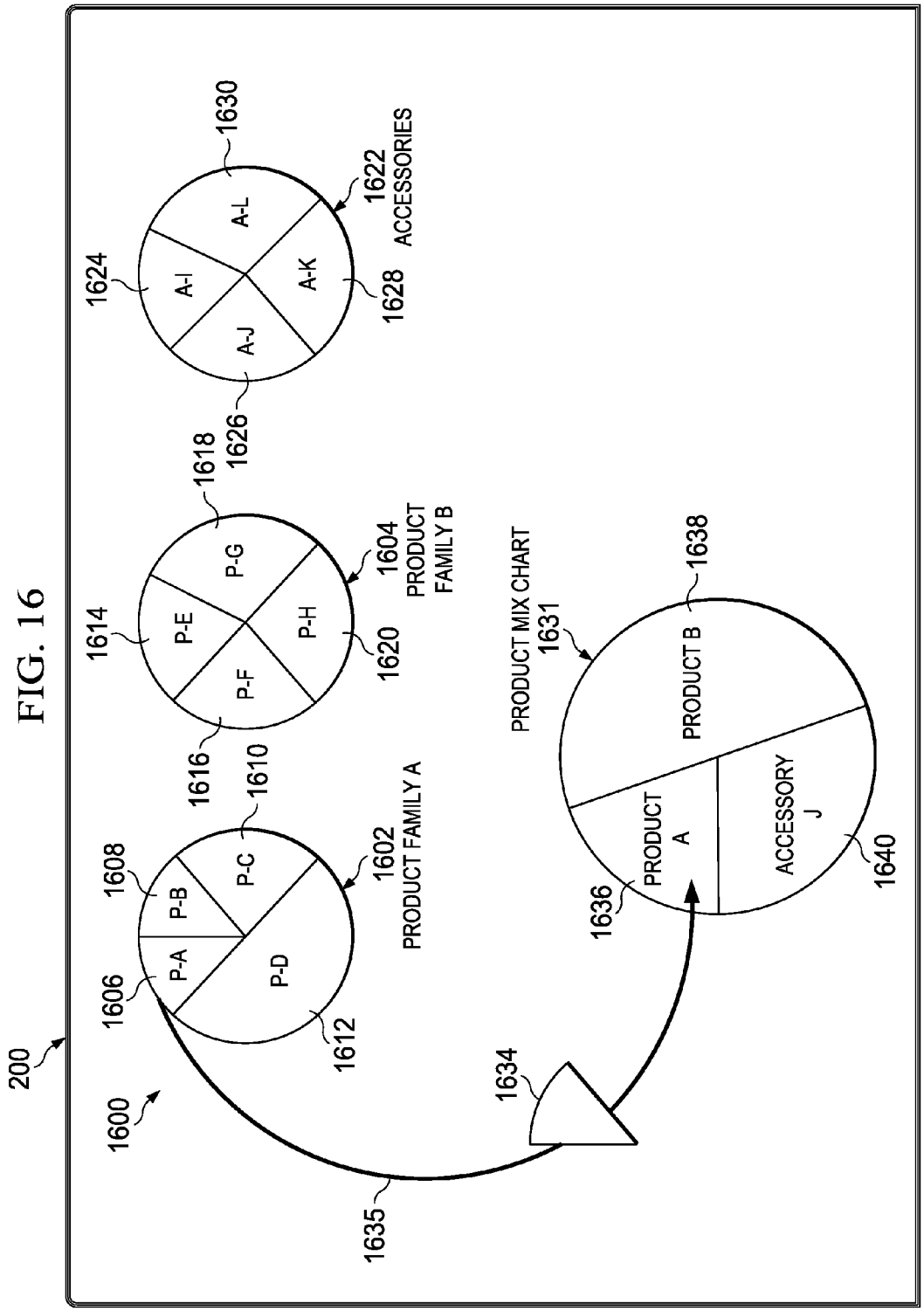
FIG. 16 is an illustration of a graphical user interface accessing information with pie charts in accordance with an illustrative embodiment.

Turning next to FIG. 16, an illustration of a graphical user interface accessing information with pie charts is depicted in accordance with an illustrative embodiment. As depicted, graphical user interface 200 shows a group of pie charts 1600. The group of pie charts 1600 includes sections for a product mix.

In this depicted example, pie chart 1602 is for products in product family "A" and pie chart 1604 is for products in product family "B." As depicted, pie chart 1602 includes section 1606 for product "A", section 1608 for product "B", section 1610 for product "C", and section 1612 for product "D"; and pie chart 1604 includes section 1614 for product "E", section 1616 for product "F", section 1618 for product "G", and section 1620 for product "H". The sizes of the sections in pie chart 1602 and pie chart 1604 are based on relative values 146 for the products located in pieces 128 of information 104.

Graphical user interface 200 also shows pie chart 1622. Pie chart 1622 is for accessories for product family "A" and product family "B." As depicted, pie chart 1622 includes section 1624 for accessory "I", section 1626 for accessory "J", section 1628 for accessory "K", and section 1630 for accessory "L". The sizes of the sections in pie chart 1622 are based on relative values 146 for the accessories located in pieces 128 of information 104. Pie chart 1602, pie chart 1604, and pie chart 1622 are examples of pie charts 112 shown in block form in FIG. 1.

Graphical user interface 200 further shows new pie chart 1631. New pie chart 1631 is an example of new pie chart 136 shown in block form in FIG. 1.

In this depicted example, user input that moves copy 1634 of section 1606 into new pie chart 1631 has been received. As depicted, this user input moves copy 1634 in the direction of arrow 1635. Section 1636 in new pie chart 1631 is a copy of section 1606. As depicted, section 1638 is a copy of section 1608 and section 1640 is a copy of section 1626.

Thus, graphical user interface 200 enables visually accessing relative values of a product mix for relative values 146 for products and accessories in pieces 128 of information 104 in pie charts 1600. For example, graphical user interface 200 enables visually accessing relative values 146 for the different products and accessories for the different product families shown in pie chart 1602, pie chart 1604, pie chart 1622, and new pie chart 1631.

Figure 17:
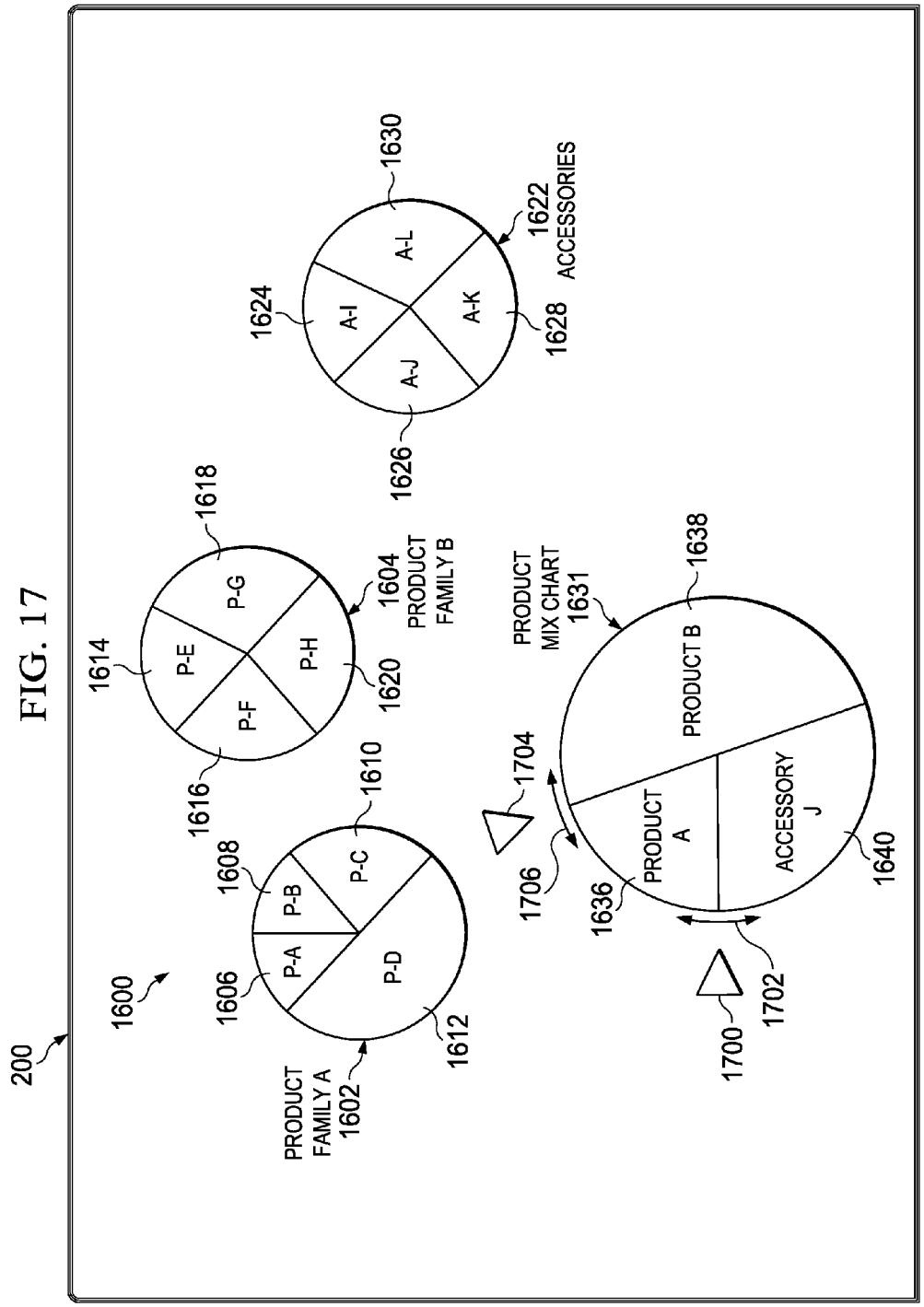
FIG. 17 is an illustration of modifying sizes of sections in a pie chart in a graphical user interface in accordance with an illustrative embodiment.

With reference next to FIG. 17, an illustration of modifying sizes of sections in a pie chart in a graphical user interface is depicted in accordance with an illustrative embodiment. In this illustrative example, user input has been received that moves graphical handle 1700 in the direction of arrow 1702.

As depicted, the sizes of section 1636 and section 1640 in new pie chart 1631 are modified in the direction of arrow 1702 based on user input that moves graphical handle 1700 in the direction of arrow 1702. The value of product "A" and the value of accessory "J" in pieces 128 of information 104 are represented by section 1636 and section 1640. User input that changes the sizes of section 1636 and section 1640 changes the value of product "A" and the value of accessory "J" in pieces 128 of information 104.

The sizes of section 1636 and section 1638 in new pie chart 1631 are modified in the direction of arrow 1706 based on additional user input that moves graphical handle 1704 in the direction of arrow 1706. The value of product "A" and the value of product "B" in pieces 128 of information 104 correspond to the size of section 1636 and section 1638. The value of product "A" and the value of product "B" are changed responsive to additional user input that changes the sizes of section 1636 and section 1638.

Figure 18:
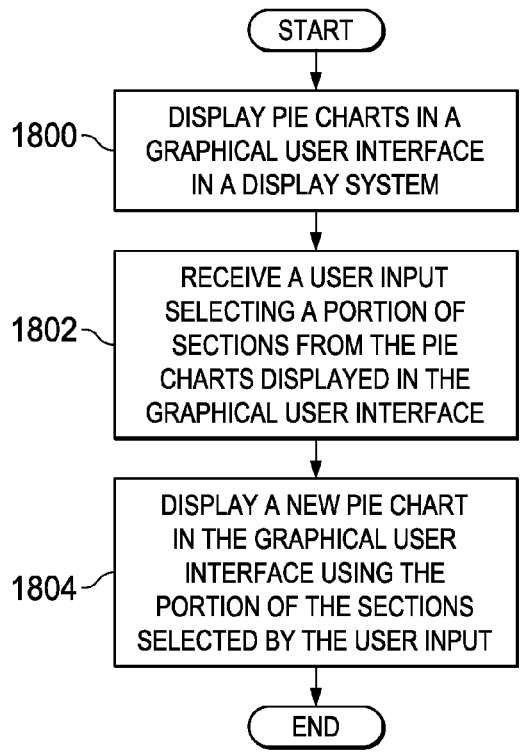
FIG. 18 is an illustration of a high level flowchart of a process for visually accessing information in accordance with an illustrative embodiment.

Turning next to FIG. 18, an illustration of a high level flowchart of a process for visually accessing information is depicted in accordance with an illustrative embodiment. The different steps illustrated in FIG. 18 may be implemented in computer system 111 in FIG. 1. For example, the process may be implemented in pie chart system 108 in computer system 111 in FIG. 1.

The process begins by displaying pie charts in a graphical user interface in a display system (step 1800). The pie charts displayed in step 1800 have sections that represent pieces of the information, and each of the pie charts represents a type of the information.

The process receives a user input selecting a portion of sections from the pie charts displayed in the graphical user interface (step 1802). The process displays a new pie chart in the graphical user interface using the portion of the sections selected by the user input (step 1804) with the process terminating thereafter. The new pie chart has new sections representing selected pieces of information corresponding to the portion of the sections. The new sections have a number of sizes based on a policy, and the number of sizes for the new sections indicates relative values of the pieces of information to each other in the new pie chart. At least one of the pie charts or the new pie chart enables visually accessing the information.

Figure 19:
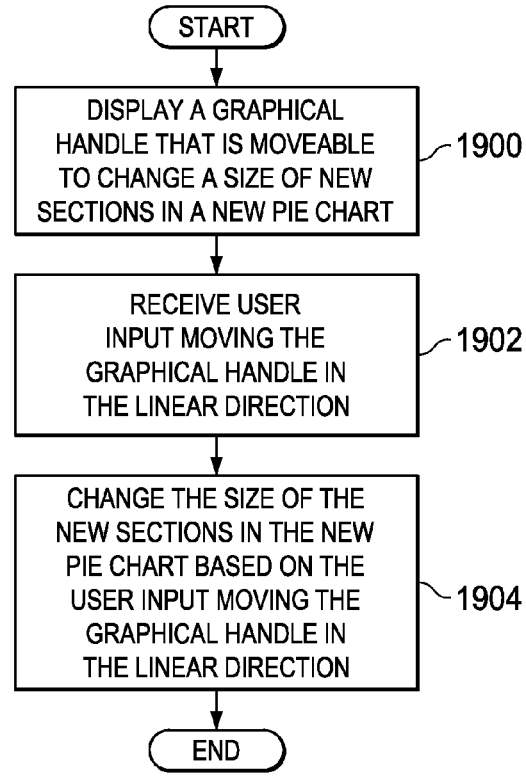
FIG. 19 is an illustration of a high level flowchart of a process for changing sizes of sections of a pie chart in accordance with an illustrative embodiment.

With reference to FIG. 19, an illustration of a high level flowchart of a process for changing sizes of sections of a pie chart is depicted in accordance with an illustrative embodiment. The different steps illustrated in FIG. 19 may be implemented in computer system 111 in FIG. 1. For example, the process may be implemented in pie chart system 108 in computer system 111 in FIG. 1.

The process begins by displaying a graphical handle that is moveable to change a size of new sections in a new pie chart (step 1900). In this illustrative example, the graphical handle is moveable in a linear direction. The new sections represent selected pieces of information corresponding to a portion of sections selected from pie charts. The new sections have a number of sizes based on a policy, and the number of sizes for the new sections indicates relative values of the pieces of information to each other in the new pie chart.

The process receives user input moving the graphical handle in the linear direction (step 1902). The process then changes the size of the new sections in the new pie chart based on the user input moving the graphical handle in the linear direction (step 1904) with the process terminating thereafter.

Figure 20:
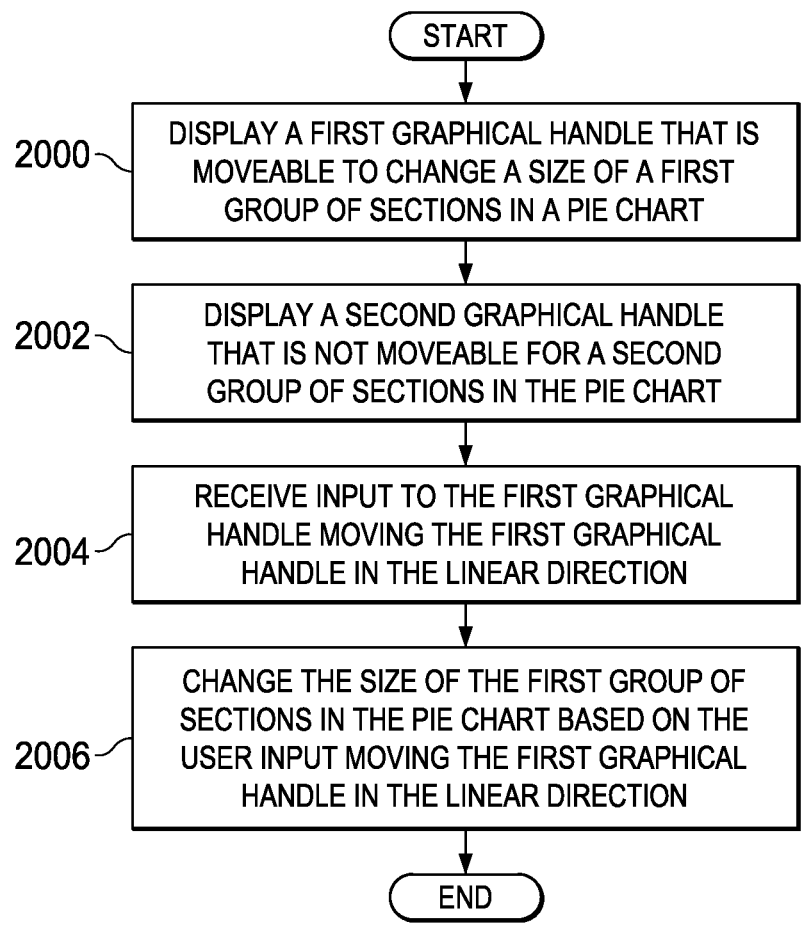
FIG. 20 is an illustration of a high level flowchart of a process for preventing changes to sizes of sections of a pie chart in accordance with an illustrative embodiment.

With reference now to FIG. 20, an illustration of a high level flowchart of a process for preventing changes to sizes of sections of a pie chart is depicted in accordance with an illustrative embodiment. The different steps illustrated in FIG. 20 may be implemented in computer system 111 in FIG. 1. For example, the process may be implemented in pie chart system 108 in computer system 111 in FIG. 1.

The process begins by displaying a first graphical handle that is moveable to change a size of a first group of sections in a pie chart (step 2000). The process also displays a second graphical handle that is not moveable for a second group of sections in the pie chart (step 2002). In this illustrative example, the first graphical handle is moveable in a linear direction. The first graphical handle is moveable based on a policy with a rule that allows for changes to sizes of the first group of sections. The second graphical handle is not moveable based on the policy having a rule that prevents changes to the sizes of the first group of sections.

The sections in the first group of sections and second group of sections represent pieces of information. These sections have a number of sizes based on a policy, and the number of sizes for the sections indicates relative values of the pieces of information to each other in the pie chart.

The process receives input to the first graphical handle moving the first graphical handle in the linear direction (step 2004). The process then changes the size of the first group of sections in the pie chart based on the user input moving the first graphical handle in the linear direction (step 2006) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 21:
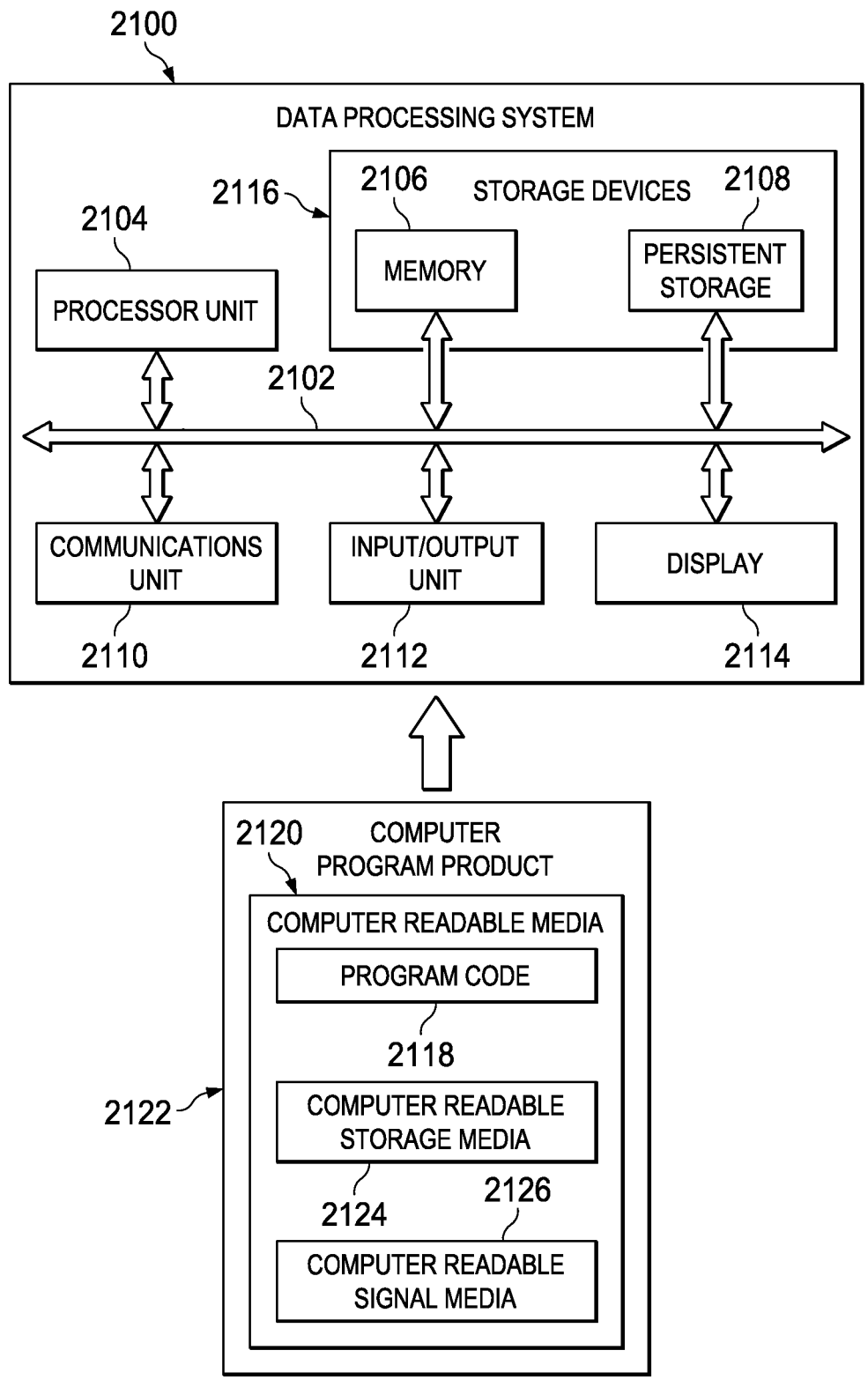
FIG. 21 is an illustration of a block diagram of a data processing system in accordance with an illustrative embodiment.

Turning now to FIG. 21, an illustration of a block diagram of a data processing system is depicted in accordance with an illustrative embodiment. Data processing system 2100 may be used to implement one or more computers in computer system 111. In this illustrative example, data processing system 2100 includes communications framework 2102, which provides communications between processor unit 2104, memory 2106, persistent storage 2108, communications unit 2110, input/output (I/O) unit 2112, and display 2114. In this example, communications framework 2102 may take the form of a bus system.

Processor unit 2104 serves to execute instructions for software that may be loaded into memory 2106. Processor unit 2104 may be a number of processors, a multi-processor core, or some other type of processor, depending on the particular implementation.

Memory 2106 and persistent storage 2108 are examples of storage devices 2116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2116 may also be referred to as computer readable storage devices in these illustrative examples. Memory 2106, in these examples, may be, for example, a random access memory or any other suitable volatile or non-volatile storage device. Persistent storage 2108 may take various forms, depending on the particular implementation.

For example, persistent storage 2108 may contain one or more components or devices. For example, persistent storage 2108 may be a hard drive, a flash memory, a rewritable optical disk, a rewritable magnetic tape, or some combination of the above. The media used by persistent storage 2108 also may be removable. For example, a removable hard drive may be used for persistent storage 2108.

Communications unit 2110, in these illustrative examples, provides for communications with other data processing systems or devices. In these illustrative examples, communications unit 2110 is a network interface card.

Input/output unit 2112 allows for input and output of data with other devices that may be connected to data processing system 2100. For example, input/output unit 2112 may provide a connection for user input through at least of a keyboard, a mouse, or some other suitable input device. Further, input/output unit 2112 may send output to a printer. Display 2114 provides a mechanism to display information to a user.

Instructions for at least one of the operating system, applications, or programs may be located in storage devices 2116, which are in communication with processor unit 2104 through communications framework 2102. The processes of the different embodiments may be performed by processor unit 2104 using computer-implemented instructions, which may be located in a memory, such as memory 2106.

These instructions are referred to as program code, computer usable program code, or computer readable program code that may be read and executed by a processor in processor unit 2104. The program code in the different embodiments may be embodied on different physical or computer readable storage media, such as memory 2106 or persistent storage 2108.

Program code 2118 is located in a functional form on computer readable media 2120 that is selectively removable and may be loaded onto or transferred to data processing system 2100 for execution by processor unit 2104. Program code 2118 and computer readable media 2120 form computer program product 2122 in these illustrative examples. In one example, computer readable media 2120 may be computer readable storage media 2124 or computer readable signal media 2126.

In these illustrative examples, computer readable storage media 2124 is a physical or tangible storage device used to store program code 2118 rather than a medium that propagates or transmits program code 2118.

Alternatively, program code 2118 may be transferred to data processing system 2100 using computer readable signal media 2126. Computer readable signal media 2126 may be, for example, a propagated data signal containing program code 2118. For example, computer readable signal media 2126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2100 are not meant to provide architectural limitations to the manner in which different embodiments may be implemented. The different illustrative embodiments may be implemented in a data processing system including components in addition to or in place of those illustrated for data processing system 2100. Other components shown in FIG. 21 can be varied from the illustrative examples shown. The different embodiments may be implemented using any hardware device or system capable of running program code 2118.

In this manner, the illustrative embodiments provide a method and apparatus for visually accessing information. One or more illustrative examples display information in pie charts in a graphical user interface. These pie charts may be manipulated to form a new pie chart. The new pie chart is comprised of pieces of information. These pieces of information are selected from the existing pie charts in the graphical user interface.

The information in the new pie chart may be saved as a new collection of information. This collection may be a record or some other suitable type of data structure. In this manner, information may be viewed and combined through pie charts displayed in the graphical user interface.

This type of access to information, using pie charts displayed in a graphical user interface and the new pie chart, enables visually accessing the information. This type of access allows for more efficient or easier manipulation of information as compared to currently available systems that may display records from a database or display information in spreadsheets.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for visually accessing information, the method comprising:
    displaying, by a computer system, pie charts in a graphical user interface in a display system, wherein the pie charts have sections that represent pieces of the information and each of the pie charts represents a type of the information;
    receiving, by the computer system, a user input selecting a portion of the sections from the pie charts displayed in the graphical user interface;
    displaying, by the computer system, the pie charts and a new pie chart in the graphical user interface, the new pie chart using the portion of the sections selected by the user input, wherein the new pie chart has new sections representing selected pieces of the information corresponding to the portion of the sections but does not include sections representing unselected pieces of the information corresponding to an unselected portion of the sections, wherein the new sections have a number of sizes based on a policy, wherein the number of sizes for the new sections indicates relative values of the pieces of the information with respect to each other in the new pie chart, and wherein the new pie chart enables visually accessing the information;
    displaying, by the computer system, a graphical handle associated with the new section, wherein graphical handle includes an indicator that indicates whether changes to a size of the section are allowed, wherein the indicator is at least one of a color shown on the graphical handle, a pattern shown on the graphical handle, and an icon displayed in association with the graphical handle; and
    changing a size of the new sections in the new pie chart when changes to a size of the section are allowed and additional user input is received that changes the size of the new sections in the new pie chart.

2. The method of claim 1, wherein the changing step comprises:
    changing the size of the new sections in the new pie chart based on the policy when additional user input is received that changes a new section in the new sections.

3. The method of claim 1, wherein the graphical handle is movable in at least one of a linear direction or an angular direction.

4. The method of claim 1, wherein the user input selecting the portion is a drag and drop operation using a pointer controlled by a user input device.

5. The method of claim 1, wherein the policy identifies the number of sizes of the new sections based on relative sizes of the portion of the sections in the pie charts.

6. The method of claim 1, wherein the policy includes a rule that allows for changes to sizes of a group of the sections from the pie charts displayed in the graphical user interface.

7. The method of claim 1, wherein the policy includes a rule that prevents changes to sizes of a group of the sections from the pie charts displayed in the graphical user interface.

8. The method of claim 1, wherein the information is for people in an organization and is selected from at least one of a skill, an experience, a position, a compensation level, a tenure, or a geographic location.

9. A computer system comprising:
    a display system; and
    a pie chart system in communication with the display system, wherein the pie chart system displays pie charts in a graphical user interface in the display system, wherein the pie charts have sections that represent pieces of information, and each of the pie charts represents a type of the information; receives a user input selecting a portion of the sections from the pie charts displayed in the graphical user interface; displays the pie charts and a new pie chart in the graphical user interface, the new pie chart using the portion of the sections selected by the user input, wherein the new pie chart has new sections representing selected pieces of the information corresponding to the portion of the sections but does not include sections representing unselected pieces of the information corresponding to an unselected portion of the sections, wherein the new sections have a number of sizes based on a policy, and wherein the number of sizes for the new sections indicates relative values of the pieces of the information with respect to each other in the new pie chart, and wherein the new pie chart enables visually accessing the information; and displays a graphical handle associated with the new section, wherein the graphical handle includes an indicator that indicates whether changes to a size of the section are allowed, wherein the indicator is at least one of a color shown on the graphical handle, a pattern shown on the graphical handle, and an icon displayed in association with the graphical handle; and changes a size of the new sections in the new pie chart when changes to a size of the section are allowed and additional user input is received that changes the size of the new sections in the new pie chart.

10. The computer system of claim 9, wherein in changing the size of the new sections, the pie chart system changes the size of the new sections in the new pie chart based on the policy when additional user input is received that changes a new section in the new sections.

11. The computer system of claim 9, wherein the graphical handle is movable in at least one of a linear direction or an angular direction.

12. The computer system of claim 9, wherein the user input selecting the portion is a drag and drop operation using a pointer controlled by a user input device.

13. The computer system of claim 9, wherein the policy identifies the number of sizes of the new sections based on relative sizes of the portion of the sections in the pie charts.

14. The computer system of claim 9, wherein the policy includes a rule that that allows for changes to sizes of a group of sections from the pie charts displayed in the graphical user interface.

15. The computer system of claim 9, wherein the policy includes a rule that prevents changes to sizes of a group of sections from the pie charts displayed in the graphical user interface.

16. The computer system of claim 9, wherein the information is for people in an organization and is selected from at least one of a skill, an experience, a position, a compensation level, a tenure, or a geographic location.

17. A computer program product for visually accessing information, the computer program product comprising:
  a computer readable storage media;
  first program code, stored on the computer readable storage media, for displaying pie charts in a graphical user interface in a display system, wherein the pie charts have sections that represent pieces of information and each of the pie charts represents a type of the information;
  second program code, stored on the computer readable storage media, for receiving a user input selecting a portion of sections from the pie charts displayed in the graphical user interface;
  third program code, stored on the computer readable storage media, for displaying the pie charts and a new pie chart in the graphical user interface, the new pie chart using the portion of the sections selected by the user input, wherein the new pie chart has new sections representing selected pieces of the information corresponding to the portion of the sections but does not include sections representing unselected pieces of the information corresponding to an unselected portion of the sections, wherein the new sections have a number of sizes based on a policy, wherein the number of sizes for the new sections indicates relative values of the pieces of the information with respect to each other in the new pie chart, and wherein the new pie chart enables visually accessing the information;
  fourth program code, stored on the computer readable storage media, for displaying a graphical handle associated with the new section, wherein graphical handle includes an indicator that indicates whether changes to a size of the section are allowed, wherein the indicator is at least one of a color shown on the graphical handle, a pattern shown on the graphical handle, and an icon displayed in association with the graphical handle; and
  fifth program code, stored on the computer readable storage media, for changing a size of the new sections in the new pie chart when changes to a size of the section are allowed and additional user input is received that changes the size of the new sections in the new pie chart.

18. The computer program product of claim 17, wherein the fifth program code comprises:
  program code for changing the size of the new sections in the new pie chart based on the policy when the additional user input is received that changes a new section in the new sections.

\* \* \* \* \*